(12) United States Patent
Kan et al.

(10) Patent No.: US 12,450,316 B1
(45) Date of Patent: Oct. 21, 2025

(54) DETECTION METHOD, SYSTEM, MEDIUM AND DEVICE BASED ON MULTI-SPECTRAL DATA FUSION

(71) Applicant: National Institute of Metrology China, Beijing (CN)

(72) Inventors: Ying Kan, Beijing (CN); Ke Li, Beijing (CN); Zhengdong Zhang, Beijing (CN); Dan Song, Beijing (CN); Xin Zhang, Beijing (CN); Chaomin Ding, Beijing (CN); Fan Liu, Beijing (CN); Qi Li, Beijing (CN)

(73) Assignee: National Institute of Metrology China, Beijing (CN)

( * ) Notice: Subject to any disclaimer, the term of this patent is extended or adjusted under 35 U.S.C. 154(b) by 0 days.

(21) Appl. No.: 19/241,593

(22) Filed: Jun. 18, 2025

Related U.S. Application Data

(63) Continuation of application No. PCT/CN2025/076911, filed on Feb. 12, 2025.

Foreign Application Priority Data

May 31, 2024 (CN) .......................... 202410697313.0

(51) Int. Cl.
   *G06N 20/00* (2019.01)
   *G06F 18/25* (2023.01)
(52) U.S. Cl.
   CPC ........... *G06F 18/251* (2023.01); *G06N 20/00* (2019.01)

(58) Field of Classification Search
   CPC .............................. G06N 20/00; G06F 18/251
   See application file for complete search history.

(56) References Cited

U.S. PATENT DOCUMENTS

| | | | |
|---|---|---|---|
| 2019/0162658 A1 | 5/2019 | Zhang et al. | |
| 2023/0267369 A1 | 8/2023 | Kalivas et al. | |
| 2024/0402079 A1* | 12/2024 | Hoffmann | .......... G01N 21/3563 |

FOREIGN PATENT DOCUMENTS

| | | |
|---|---|---|
| CN | 110361373 A | 10/2019 |
| CN | 111595807 A | 8/2020 |
| CN | 112179871 A | 1/2021 |
| CN | 114062300 A | 2/2022 |
| CN | 114441468 A | 5/2022 |
| CN | 115452758 A | 12/2022 |
| CN | 116067905 A | 5/2023 |
| CN | 118603931 A | 9/2024 |

OTHER PUBLICATIONS

Du, "Quantitative analysis of the illegal addition of Atenolol in Panax notoginseng based on NIR-MIR spectral data fusion and calibration transfer", RSC Advances, Apr. 17, 2024. (Year: 2024).*

(Continued)

*Primary Examiner* — Dave Misir
(74) *Attorney, Agent, or Firm* — Cooper Legal Group, LLC

(57) ABSTRACT

A method, a system, a medium and a device based on multi-spectral data fusion are provided. The method includes: collecting spectrum: collecting NIR spectrum and MIR spectrum of a substance to be detected to obtain a NIR spectrum matrix and a MIR spectrum matrix of the substance to be detected; constructing a detection model; training the detection model; and predicting detection indexes.

17 Claims, 10 Drawing Sheets

(56) References Cited

OTHER PUBLICATIONS

Sun, "Data fusion of near-infrared and mid-infrared spectra for identification of rhubarb", Spectrochimica Acta Part A: Molecular and Biomolecular Spectroscopy, 2017. (Year: 2017).*
Moro, "Data fusion applied in near and mid infrared spectroscopy for crude oil classification", Fuel, 2023. (Year: 2023).*
Retrieval report-First search dated Nov. 8, 2024 in SIPO application No. CN202410697313.0, 4 pages.
Notification to Grant Patent Right for Invention dated Nov. 13, 2024 in SIPO application No. CN202410697313.0, 3 pages.
Notice of correction of granting patent right dated Dec. 2, 2024 in SIPO application No. CN202410697313.0, 4 pages.
International Search Report issued in corresponding PCT Application No. PCT/CN2025/076911 dated May 14, 2025, 10 pages.

* cited by examiner

DETECTION METHOD, SYSTEM, MEDIUM AND DEVICE BASED ON MULTI-SPECTRAL DATA FUSION

CROSS-REFERENCE TO RELATED APPLICATIONS

This application is a continuation of International Patent Application No. PCT/CN2025/076911, filed on Feb. 12, 2025, and claims priority of Chinese Patent Application No. 202410697313.0, filed on May 31, 2024. The entire contents of International Patent Application No. PCT/CN2025/076911 and Chinese Patent Application No. 202410697313.0 are incorporated herein by reference.

TECHNICAL FIELD

The disclosure relates to the technical field of gasoline and diesel oil detection, in particular to a detection method, a system, a medium and a device based on multi-spectral data fusion.

BACKGROUND

There are two main methods for rapid detection of oil products:
- one is the combination of near infrared (NIR) spectrum technology and chemometric model, for example, the chemometric model is established by using NIR spectrum to determine the ethanol content in ethanol gasoline;
- the other is the combination of mid infrared (MIR) spectrum technology and chemometric model, for example, the cetane number of diesel oil is determined by using MIR spectrum combined with chemometric model; and
- both of the above two methods obtain the chemical information of the components to be detected by a single spectrum technology (using NIR spectrum or MIR spectrum), which has the disadvantage of being one-sided in obtaining the chemical information of the components to be detected. For example, the NIR spectrum of the first oil product rapid detection method may only obtain the information of the frequency doubling and combination frequency of the vibration of hydrogen-containing groups; and the MIR spectrum of the second oil product rapid detection method may only obtain the fundamental frequency information of supplementary hydrogen-containing groups. Therefore, a single spectrum may not obtain more comprehensive, reliable and abundant chemical information. For this reason, the prediction performance of single spectrum model (for example, determining the flash point of diesel oil) still has room for further improvement.

SUMMARY

The disclosure provides a detection method based on multi-spectral data fusion, including:
- collecting spectrum: collecting NIR spectrum and MIR spectrum of a substance to be detected to obtain a NIR spectrum matrix and a MIR spectrum matrix of the substance to be detected;
- constructing a detection model: constructing the detection model by a following formula, $$Y = XP^T BQ$$

where X is an input matrix, Y is an output matrix, B is a coefficient matrix, and P and Q are load matrices of X and Y respectively; and T is a score matrix of an independent variable X;
- training the detection model; and
- predicting detection indexes;

where steps of training the detection model include:
- collecting training samples to construct training sets, where the training sets include NIR spectrum and MIR spectrum of a plurality of the training samples and index values of detection indexes of the plurality of the training samples;
- dividing the training sets into a calibration set and a verification set to obtain a NIR spectrum matrix, a MIR spectrum matrix and an index matrix of the calibration set and a NIR spectrum matrix, a MIR spectrum matrix and an index matrix of the verification set;
- performing spectrum preprocessing on NIR spectrum and MIR spectrum of the calibration set and the verification set respectively to obtain a NIR spectrum preprocessing matrix and a MIR spectrum preprocessing matrix of the calibration set, and a NIR spectrum preprocessing matrix and a MIR spectrum preprocessing matrix of the verification set, where the spectrum preprocessing includes derivative processing or/and vector normalization (VN) processing, and the derivative processing includes first-order derivative processing or/and higher-order derivative processing;
- performing spectrum variable screening processing on the NIR spectrum, the MIR spectrum, NIR spectrum after the spectrum preprocessing and MIR spectrum after the spectrum preprocessing of the calibration set and the verification set respectively to obtain a NIR spectrum variable screening matrix, a MIR spectrum variable screening matrix, a preprocessing NIR spectrum variable screening matrix and a preprocessing MIR spectrum variable screening matrix of the calibration set, and a NIR spectrum variable screening matrix, a MIR spectrum variable screening matrix, a preprocessing NIR spectrum variable screening matrix and a preprocessing MIR spectrum variable screening matrix of the verification set, where the spectrum variable screening processing includes competitive adaptive reweighted sampling (CARS) processing or/and variable importance projection (VIP) processing;
- inputting the NIR spectrum matrix and the index matrix of the calibration set into the detection model, and training the detection model to obtain a first coefficient matrix;
- inputting the MIR spectrum matrix and the index matrix of the calibration set into the detection model, and training the detection model to obtain a second coefficient matrix;
- inputting the NIR spectrum preprocessing matrix and the index matrix of the calibration set into the detection model, and training the detection model to obtain a third coefficient matrix;
- inputting the MIR spectrum preprocessing matrix and the index matrix of the calibration set into the detection model, and training the detection model to obtain a fourth coefficient matrix;
- inputting the NIR spectrum matrix of the calibration set into a detection model corresponding to the first coefficient matrix to obtain a calibration set first index prediction matrix composed of predicted values of detection indexes of the calibration set;
- inputting the MIR spectrum matrix of the calibration set into a detection model corresponding to the second coefficient matrix to obtain a calibration set second index prediction matrix composed of the predicted values of the detection indexes of the calibration set;

inputting the NIR spectrum preprocessing matrix of the calibration set into a detection model corresponding to the third coefficient matrix to obtain a calibration set third index prediction matrix composed of the predicted values of the detection indexes of the calibration set;

inputting the MIR spectrum preprocessing matrix of the calibration set into a detection model corresponding to the fourth coefficient matrix to obtain a calibration set fourth index prediction matrix composed of the predicted values of the detection indexes of the calibration set;

inputting the NIR spectrum matrix of the verification set into the detection model corresponding to the first coefficient matrix to obtain a verification set first index prediction matrix composed of predicted values of detection indexes of the verification set;

inputting the MIR spectrum matrix of the verification set into the detection model corresponding to the second coefficient matrix to obtain a verification set second index prediction matrix composed of the predicted values of the detection indexes of the verification set;

inputting the NIR spectrum preprocessing matrix of the verification set into the detection model corresponding to the third coefficient matrix to obtain a verification set third index prediction matrix composed of the predicted values of the detection indexes of the verification set;

inputting the MIR spectrum preprocessing matrix of the verification set into the detection model corresponding to the fourth coefficient matrix to obtain a verification set fourth index prediction matrix composed of the predicted values of the detection indexes of the verification set;

obtaining a first verification value, a second verification value, a third verification value and a fourth verification value respectively according to verification indexes through the verification set first index prediction matrix, the verification set second index prediction matrix, the verification set third index prediction matrix, the verification set fourth index prediction matrix and the index matrix, where the verification indexes are used for representing prediction performance of the detection model;

taking an optimal value of the first verification value, the second verification value, the third verification value and the fourth verification value as an optimal verification value, taking the optimal verification value as a threshold value, and taking a range of the threshold value in a direction of improving the prediction performance of the detection model as a threshold value range;

performing data-level fusion on the NIR spectrum matrix and the MIR spectrum matrix of the calibration set to form a calibration set first data-level fusion matrix, and inputting the calibration set first data-level fusion matrix and the index matrix of the calibration set into the detection model to train the detection model to obtain a fifth coefficient matrix;

performing the data-level fusion on the NIR spectrum preprocessing matrix and the MIR spectrum preprocessing matrix of the calibration set to form a calibration set second data-level fusion matrix, and inputting the calibration set second data-level fusion matrix and the index matrix of the calibration set into the detection model to train the detection model to obtain a sixth coefficient matrix;

taking the calibration set first data-level fusion matrix as the input matrix, inputting a detection model corresponding to the fifth coefficient matrix, and obtaining a calibration set fifth index prediction matrix composed of the predicted values of the detection indexes of the calibration set;

taking the calibration set second data-level fusion matrix as the input matrix, inputting a detection model corresponding to the sixth coefficient matrix, and obtaining a calibration set sixth index prediction matrix composed of the predicted values of the detection indexes of the verification set;

taking a verification set first data-level fusion matrix formed by data-level fusion of the NIR spectrum matrix and the MIR spectrum matrix of the verification set as the input matrix, and inputting the detection model corresponding to the fifth coefficient matrix to obtain a verification set fifth index prediction matrix composed of the predicted values of the detection indexes of the verification set;

taking a verification set second data-level fusion matrix formed by data-level fusion of the NIR spectrum preprocessing matrix and the MIR spectrum preprocessing matrix of the verification set as the input matrix, and inputting the detection model corresponding to the sixth coefficient matrix to obtain a verification set sixth index prediction matrix composed of the predicted values of the detection indexes of the verification set;

respectively obtaining a fifth verification value and a sixth verification value according to the verification indexes through the verification set fifth index prediction matrix, the verification set sixth index prediction matrix and the index matrix;

performing feature-level fusion on the NIR spectrum variable screening matrix and the MIR spectrum variable screening matrix of the calibration set to form a calibration set first feature-level fusion matrix, inputting the calibration set first feature-level fusion matrix and the index matrix of the calibration set into the detection model, and training the detection model to obtain a seventh coefficient matrix;

performing the feature-level fusion on the preprocessing NIR spectrum variable screening matrix and the preprocessing MIR spectrum variable screening matrix of the calibration set to form a calibration set second feature-level fusion matrix, inputting the calibration set second feature-level fusion matrix and the index matrix of the calibration set into the detection model, and training the detection model to obtain an eighth coefficient matrix;

taking the calibration set first feature-level fusion matrix as the input matrix, inputting a detection model corresponding to the seventh coefficient matrix, and obtaining a calibration set seventh index prediction matrix composed of the predicted values of the detection indexes of the calibration set;

taking the calibration set second feature-level fusion matrix as the input matrix, inputting a detection model corresponding to the eighth coefficient matrix, and obtaining a calibration set eighth index prediction matrix composed of the predicted values of the detection indexes of the calibration set;

taking a verification set first feature-level fusion matrix formed by feature-level fusion of the NIR spectrum variable screening matrix and the MIR spectrum variable screening matrix of the verification set as the input matrix, and inputting the detection model corresponding to the seventh coefficient matrix to obtain a verification set seventh index prediction matrix composed of the predicted values of the detection indexes of the verification set;

taking a verification set second feature-level fusion matrix formed by data-level fusion of the preprocessing NIR spectrum variable screening matrix and the preprocessing MIR spectrum variable screening matrix of the verification set as the input matrix, and inputting the detection model corresponding to the eighth coefficient matrix to obtain a verification set eighth index prediction matrix composed of the predicted values of the detection indexes of the verification set;

respectively obtaining a seventh verification value and an eighth verification value according to the verification indexes through the verification set seventh index prediction matrix, the verification set eighth index prediction matrix and the index matrix;

screening the first verification value to the eighth verification value according to the threshold value range, and screening out a verification value group within the threshold value range; and carrying out decision-level fusion on a calibration set index matrix corresponding to the verification value group to obtain a calibration set decision-level fusion matrix, inputting the calibration set decision-level fusion matrix and the calibration set index matrix into the detection model, and training the detection model to obtain a ninth coefficient matrix, where the ninth coefficient matrix is a trained coefficient matrix;

where steps of predicting the detection indexes include:

performing the data-level fusion on the NIR spectrum matrix and the MIR spectrum matrix of the substance to be detected to obtain a spectral fusion matrix; and inputting a spectral fusion matrix of the substance to be detected as the input matrix into a trained detection model to obtain a first index matrix as the output matrix; and taking the first index matrix as a detection result of detection indexes of the substance to be detected; and where the index matrix is a matrix composed of index values of detection indexes determined by a standard method; the first index matrix is a matrix composed of index values of detection indexes predicted by the detection model; and the detection indexes include one or more of a flash point, a pour point, density and kinematic viscosity.

According to one aspect of the present disclosure, the verification indexes include a determination coefficient or/and a predicted root mean square error (RMSEP).

According to one aspect of the present disclosure, the optimal verification value is a minimum value of the RMSEP or/and a maximum value of the determination coefficient; and the threshold value range is not greater than the minimum value of the RMSEP or/and not less than the maximum value of the determination coefficient.

According to an aspect of the present disclosure, the steps of predicting the detection indexes further include:

inputting the NIR spectrum matrix of the substance to be detected as the input matrix into the trained detection model to obtain a second index matrix as the output matrix;

inputting the MIR spectrum matrix of the substance to be detected as the input matrix into the trained detection model to obtain a third index matrix as the output matrix;

performing the decision-level fusion on the first index matrix, the second index matrix and the third index matrix to obtain a fourth index matrix; and inputting the fourth index matrix as the input matrix into the trained detection model to obtain a fifth index matrix as the output matrix; and taking the fifth index matrix as the detection result of the detection indexes of the substance to be detected;

where the second index matrix, the third index matrix and the fifth index matrix are matrices composed of the index values of the detection indexes predicted by the detection model.

According to one aspect of the present disclosure, before the steps of predicting the detection indexes, further including:

the spectrum preprocessing: performing the spectrum preprocessing on spectral data of the NIR spectrum of the substance to be detected to form a first spectrum matrix; performing the spectrum preprocessing on spectral data of the MIR spectrum of the substance to be detected to form a second spectrum matrix; and where the spectrum preprocessing includes the derivative processing or/and the VN processing, and the derivative processing includes the first-order derivative processing or/and the higher-order derivative processing;

the steps of predicting the detection indexes further include:

performing the data-level fusion on the first spectrum matrix and the second spectrum matrix to form a first fusion matrix;

inputting the first spectrum matrix as the input matrix into the trained detection model to obtain a sixth index matrix as the output matrix;

inputting the second spectrum matrix as the input matrix into the trained detection model to obtain a seventh index matrix as the output matrix;

inputting the first fusion matrix as the input matrix into the trained detection model to obtain an eighth index matrix as the output matrix; and performing the decision-level fusion on the sixth index matrix, the seventh index matrix and the eighth index matrix to obtain the fourth index matrix.

According to one aspect of the present disclosure, before the steps of predicting the detection indexes, further including:

spectrum variable screening: performing the spectrum variable screening processing on the NIR spectrum and the MIR spectrum of the substance to be detected respectively to form a third spectrum matrix and a fourth spectrum matrix; and where the spectrum variable screening processing includes the VIP processing;

the steps of predicting the detection indexes further include:

performing the feature-level fusion on the third spectrum matrix and the fourth spectrum matrix to form a second fusion matrix;

inputting the third spectrum matrix as the input matrix into the trained detection model to obtain a ninth index matrix as the output matrix;

inputting the fourth spectrum matrix as the input matrix into the trained detection model to obtain a tenth index matrix as the output matrix;

inputting the second fusion matrix as the input matrix into the trained detection model to obtain an eleventh index matrix as the output matrix; and performing the decision-level fusion on the ninth index matrix, the tenth index matrix and the eleventh index matrix to obtain a fourth index matrix.

Optionally, before the steps of predicting the detection indexes, further including:

the spectrum preprocessing: performing the spectrum preprocessing on spectral data of the NIR spectrum of the substance to be detected to form a first spectrum matrix; performing the spectrum preprocessing on spectral data of the MIR spectrum of the substance to be detected to form a second spectrum matrix; and where the spectrum preprocessing includes the derivative processing or/and the VN processing, and the derivative processing includes the first-order derivative processing or/and the higher-order derivative processing; and spectrum variable screening: performing the spectrum variable screening processing on the first spectrum matrix and the second spectrum matrix of the substance to be detected respectively to form a fifth spectrum matrix and a sixth spectrum matrix; and where the spectrum variable screening processing includes the VIP processing.

the steps of predicting the detection indexes further includes:

performing the data-level fusion on the first spectrum matrix and the second spectrum matrix to form a first fusion matrix;

performing the feature-level fusion on the fifth spectrum matrix and the sixth spectrum matrix to form a third fusion matrix;

inputting the first spectrum matrix as the input matrix into the trained detection model to obtain a sixth index matrix as the output matrix;

inputting the second spectrum matrix as the input matrix into the trained detection model to obtain a seventh index matrix as the output matrix;

inputting the first fusion matrix as the input matrix into the trained detection model to obtain an eighth index matrix as the output matrix;

inputting the third fusion matrix as the input matrix into the trained detection model to obtain a twelfth index matrix as the output matrix; and performing the decision-level fusion on the sixth index matrix, the seventh index matrix, the eighth index matrix, and the twelfth index matrix to obtain a fourth index matrix.

According to one aspect of the present disclosure, the steps of training the detection model include:

collecting the training samples to construct the training sets, where the training sets include the NIR spectrum and the MIR spectrum of the plurality of the training samples and the index values of the detection indexes of the plurality of the training samples;

dividing the training sets into the calibration set and the verification set to obtain the NIR spectrum matrix, the MIR spectrum matrix and the index matrix of the calibration set and the NIR spectrum matrix, the MIR spectrum matrix and the index matrix of the verification set;

performing the spectrum preprocessing on the NIR spectrum and the MIR spectrum of the calibration set and the verification set respectively to obtain the NIR spectrum preprocessing matrix and the MIR spectrum preprocessing matrix of the calibration set, and the NIR spectrum preprocessing matrix and the MIR spectrum preprocessing matrix of the verification set, where the spectrum preprocessing includes the derivative processing or/and the VN processing, and the derivative processing includes the first-order derivative processing or/and the higher-order derivative processing;

performing the spectrum variable screening processing on the NIR spectrum after the spectrum preprocessing and the MIR spectrum after the spectrum preprocessing of the calibration set and the verification set respectively to obtain the preprocessing NIR spectrum variable screening matrix and the preprocessing MIR spectrum variable screening matrix of the calibration set, and the preprocessing NIR spectrum variable screening matrix and the preprocessing MIR spectrum variable screening matrix of the verification set, where the spectrum variable screening processing includes the CARS processing or/and the VIP processing;

inputting the NIR spectrum preprocessing matrix and the index matrix of the calibration set into the detection model, and training the detection model to obtain the third coefficient matrix;

inputting the MIR spectrum preprocessing matrix and the index matrix of the calibration set into the detection model, and training the detection model to obtain the fourth coefficient matrix;

inputting the NIR spectrum preprocessing matrix of the calibration set into the detection model corresponding to the third coefficient matrix to obtain the calibration set third index prediction matrix composed of the predicted values of the detection indexes of the calibration set;

inputting the MIR spectrum preprocessing matrix of the calibration set into the detection model corresponding to the fourth coefficient matrix to obtain the calibration set fourth index prediction matrix composed of the predicted values of the detection indexes of the calibration set;

inputting the NIR spectrum preprocessing matrix of the verification set into the detection model corresponding to the third coefficient matrix to obtain the verification set third index prediction matrix composed of the predicted values of the detection indexes of the verification set;

inputting the MIR spectrum preprocessing matrix of the verification set into the detection model corresponding to the fourth coefficient matrix to obtain the verification set fourth index prediction matrix composed of the predicted values of the detection indexes of the verification set;

obtaining the third verification value and the fourth verification value respectively according to the verification indexes through the verification set third index prediction matrix, the verification set fourth index prediction matrix and the index matrix, where the verification indexes are used for representing the prediction performance of the detection model;

taking an optimal value of the third verification value and the fourth verification value as the optimal verification value, taking the optimal verification value as the threshold value, and taking the range of the threshold value in the direction of improving the prediction performance of the detection model as the threshold value range;

performing the data-level fusion on the NIR spectrum preprocessing matrix and the MIR spectrum preprocessing matrix of the calibration set to form the calibration set second data-level fusion matrix, and inputting the calibration set second data-level fusion matrix and the index matrix of the calibration set into the detection model to train the detection model to obtain the sixth coefficient matrix;

taking the calibration set second data-level fusion matrix as the input matrix, inputting the detection model corresponding to the sixth coefficient matrix, and obtaining the calibration set sixth index prediction matrix composed of the predicted values of the detection indexes of the verification set;

taking the verification set second data-level fusion matrix formed by the data-level fusion of the NIR spectrum preprocessing matrix and the MIR spectrum preprocessing matrix of the verification set as the input matrix, and inputting the detection model corresponding to the sixth coefficient matrix to obtain the verification set sixth index prediction matrix composed of the predicted values of the detection indexes of the verification set;

respectively obtaining the sixth verification value according to the verification indexes through the verification set sixth index prediction matrix and the index matrix;

performing the feature-level fusion on the preprocessing NIR spectrum variable screening matrix and the preprocessing MIR spectrum variable screening matrix of the calibration set to form the calibration set second feature-level fusion matrix, inputting the calibration set second feature-level fusion matrix and the index matrix of the calibration set into the detection model, and training the detection model to obtain the eighth coefficient matrix;

taking the calibration set second feature-level fusion matrix as the input matrix, inputting the detection model corresponding to the eighth coefficient matrix, and obtaining the calibration set eighth index prediction matrix composed of the predicted values of the detection indexes of the calibration set;

taking the verification set second feature-level fusion matrix formed by the data-level fusion of the preprocessing NIR spectrum variable screening matrix and the preprocessing MIR spectrum variable screening matrix of the verification set as the input matrix, and inputting the detection model corresponding to the eighth coefficient matrix to obtain the verification set eighth index prediction matrix composed of the predicted values of the detection indexes of the verification set;

respectively obtaining the eighth verification value according to the verification indexes through the verification set eighth index prediction matrix and the index matrix;

screening the third verification value, the fourth verification value, the sixth verification value, and the eighth verification value according to the threshold value range, and screening out the verification value group within the threshold value range; and carrying out the decision-level fusion on the calibration set index matrix corresponding to the verification value group to obtain the calibration set decision-level fusion matrix, inputting the calibration set decision-level fusion matrix and the calibration set index matrix into the detection model, and training the detection model to obtain the ninth coefficient matrix, where the ninth coefficient matrix is the trained coefficient matrix.

According to one aspect of the present disclosure, in a step of dividing the training sets into the calibration set and the verification set:

randomly dividing the calibration set and the verification set in the training sets according to a ratio of 2:1-4:1, and optionally, randomly dividing the calibration set and the verification set in the training sets according to a ratio of 3:1.

According to one aspect of the present disclosure, in the steps of training the detection model, there are the various spectrum preprocessing or/and the spectrum variable screening processing, and training the training model by using each spectrum preprocessing, each spectrum variable screening processing and a combination of the each spectrum preprocessing and the spectrum variable screening processing.

According to one aspect of the present disclosure, a method of the data-level fusion, the feature-level fusion and the decision-level fusion includes:

splicing a same-dimension matrix to perform the data-level fusion, the feature-level fusion or the decision-level fusion.

According to the second aspect of the present disclosure, a detection system based on multi-spectral data fusion, including:

a collection module, collecting NIR spectrum and MIR spectrum of a substance to be detected to obtain a NIR spectrum matrix and a MIR spectrum matrix of the substance to be detected;

a detection model construction module, constructing a detection model by a following formula, $$Y = XP^T BQ$$

where X is an input matrix, Y is an output matrix, B is a coefficient matrix, and P and Q are load matrices of X and Y respectively;

a training module, training the detection model; and a detection module, predicting detection indexes;

where the training module includes:

a training set construction unit, collecting training samples to construct training sets, where the training sets include NIR spectrum and MIR spectrum of a plurality of the training samples and index values of detection indexes of the plurality of the training samples;

a training set dividing unit, dividing the training sets constructed by the training set construction unit into a calibration set and a verification set to obtain a NIR spectrum matrix, a MIR spectrum matrix and an index matrix of the calibration set and a NIR spectrum matrix, a MIR spectrum matrix and an index matrix of the verification set;

a spectrum preprocessing unit, performing spectrum preprocessing on NIR spectrum and MIR spectrum of the calibration set and the verification set obtained by the training set dividing unit respectively to obtain a NIR spectrum preprocessing matrix and a MIR spectrum preprocessing matrix of the calibration set, and a NIR spectrum preprocessing matrix and a MIR spectrum preprocessing matrix of the verification set;

a spectrum variable screening unit, performing spectrum variable screening processing on the NIR spectrum, the MIR spectrum, NIR spectrum after the spectrum preprocessing and MIR spectrum after the spectrum preprocessing of the calibration set and the verification set obtained by the training set dividing unit respectively to obtain a NIR spectrum variable screening matrix, a MIR spectrum variable screening matrix, a preprocessing NIR spectrum variable screening matrix and a preprocessing MIR spectrum variable screening matrix of the calibration set, and a NIR spectrum variable screening matrix, a MIR spectrum variable screening matrix, a preprocessing NIR spectrum variable screening matrix and a preprocessing MIR spectrum variable screening matrix of the verification set;

a first training unit, inputting the NIR spectrum matrix and the index matrix of the calibration set obtained by the training set dividing unit into the detection model, and training the detection model to obtain a first coefficient matrix;

a second training unit, inputting the MIR spectrum matrix and the index matrix of the calibration set obtained by the training set dividing unit into the detection model, and training the detection model to obtain a second coefficient matrix;

a third training unit, inputting the NIR spectrum preprocessing matrix and the index matrix of the calibration set obtained by the spectrum preprocessing unit into the detection model, and training the detection model to obtain a third coefficient matrix;

a fourth training unit, inputting the MIR spectrum preprocessing matrix and the index matrix of the calibration set obtained by the spectrum preprocessing unit into the detection model, and training the detection model to obtain a fourth coefficient matrix;

a first prediction unit, inputting the NIR spectrum matrix of the calibration set obtained by the training set dividing unit into a detection model corresponding to the first coefficient matrix to obtain a calibration set first index prediction matrix composed of predicted values of detection indexes of the calibration set;

a second prediction unit, inputting the MIR spectrum matrix of the calibration set obtained by the training set dividing unit into a detection model corresponding to the second coefficient matrix to obtain a calibration set second index prediction matrix composed of the predicted values of the detection indexes of the calibration set;

a third prediction unit, inputting the NIR spectrum preprocessing matrix of the calibration set obtained by the spectrum preprocessing unit into a detection model corresponding to the third coefficient matrix to obtain a calibration set third index prediction matrix composed of the predicted values of the detection indexes of the calibration set;

a fourth prediction unit, inputting the MIR spectrum preprocessing matrix of the calibration set obtained by the spectrum preprocessing unit into a detection model corresponding to the fourth coefficient matrix to obtain a calibration set fourth index prediction matrix composed of the predicted values of the detection indexes of the calibration set;

a fifth prediction unit, inputting the NIR spectrum matrix of the verification set obtained by the training set dividing unit into the detection model corresponding to the first coefficient matrix to obtain a verification set first index prediction matrix composed of predicted values of detection indexes of the verification set;

a sixth prediction unit, inputting the MIR spectrum matrix of the verification set obtained by the training set dividing unit into the detection model corresponding to the second coefficient matrix to obtain a verification set second index prediction matrix composed of the predicted values of the detection indexes of the verification set;

a seventh prediction unit, inputting the NIR spectrum preprocessing matrix of the verification set obtained by the spectrum preprocessing unit into the detection model corresponding to the third coefficient matrix to obtain a verification set third index prediction matrix composed of the predicted values of the detection indexes of the verification set;

an eighth prediction unit, inputting the MIR spectrum preprocessing matrix of the verification set obtained by the spectrum preprocessing unit into the detection model corresponding to the fourth coefficient matrix to obtain a verification set fourth index prediction matrix composed of the predicted values of the detection indexes of the verification set;

a first verification unit, obtaining a first verification value, a second verification value, a third verification value and a fourth verification value respectively according to verification indexes through the verification set first index prediction matrix obtained by the fifth prediction unit, the verification set second index prediction matrix obtained by the sixth prediction unit, the verification set third index prediction matrix obtained by the seventh prediction unit, the verification set fourth index prediction matrix obtained by the eighth prediction unit and the index matrix obtained by the training set dividing unit, where the verification indexes are used for representing prediction performance of the detection model;

a threshold value range obtaining unit, taking an optimal value of the first verification value, the second verification value, the third verification value and the fourth verification value obtained by the first verification unit as an optimal verification value, taking the optimal verification value as a threshold value, and taking a range of the threshold value in a direction of improving the prediction performance of the detection model as a threshold value range;

a fifth training unit, performing data-level fusion on the NIR spectrum matrix and the MIR spectrum matrix of the calibration set obtained by the training set dividing unit to form a calibration set first data-level fusion matrix, and inputting the calibration set first data-level fusion matrix and the index matrix of the calibration set into the detection model to train the detection model to obtain a fifth coefficient matrix;

a sixth training unit, performing the data-level fusion on the NIR spectrum preprocessing matrix and the MIR spectrum preprocessing matrix of the calibration set obtained by the spectrum preprocessing unit to form a calibration set second data-level fusion matrix, and inputting the calibration set second data-level fusion matrix and the index matrix of the calibration set into the detection model to train the detection model to obtain a sixth coefficient matrix;

a ninth prediction unit, taking the calibration set first data-level fusion matrix as the input matrix, inputting a detection model corresponding to the fifth coefficient matrix, and obtaining a calibration set fifth index prediction matrix composed of the predicted values of the detection indexes of the calibration set;

a tenth prediction unit, taking the calibration set second data-level fusion matrix as the input matrix, inputting a detection model corresponding to the sixth coefficient matrix, and obtaining a calibration set sixth index prediction matrix composed of the predicted values of the detection indexes of the verification set;

an eleventh prediction unit, taking a verification set first data-level fusion matrix formed by data-level fusion of the NIR spectrum matrix and the MIR spectrum matrix of the verification set as the input matrix, and inputting the detection model corresponding to the fifth coefficient matrix to obtain a verification set fifth index prediction matrix composed of the predicted values of the detection indexes of the verification set;

a twelfth prediction unit, taking a verification set second data-level fusion matrix formed by data-level fusion of the NIR spectrum preprocessing matrix and the MIR spectrum preprocessing matrix of the verification set as the input matrix, and inputting the detection model corresponding to the sixth coefficient matrix to obtain a verification set sixth index prediction matrix composed of the predicted values of the detection indexes of the verification set;

a second verification unit, respectively obtaining a fifth verification value and a sixth verification value according to the verification indexes through the verification set fifth index prediction matrix, the verification set sixth index prediction matrix and the index matrix;

a seventh training unit, performing feature-level fusion on the NIR spectrum variable screening matrix and the MIR spectrum variable screening matrix of the calibration set to form a calibration set first feature-level fusion matrix, inputting the calibration set first feature-level fusion matrix and the index matrix of the calibration set into the detection model, and training the detection model to obtain a seventh coefficient matrix;

an eighth training unit, performing the feature-level fusion on the preprocessing NIR spectrum variable screening matrix and the preprocessing MIR spectrum variable screening matrix of the calibration set to form a calibration set second feature-level fusion matrix, inputting the calibration set second feature-level fusion matrix and the index matrix of the calibration set into the detection model, and training the detection model to obtain an eighth coefficient matrix;

a thirteenth prediction unit, taking the calibration set first feature-level fusion matrix as the input matrix, inputting a detection model corresponding to the seventh coefficient matrix, and obtaining a calibration set seventh index prediction matrix composed of the predicted values of the detection indexes of the calibration set;

a fourteenth prediction unit, taking the calibration set second feature-level fusion matrix as the input matrix, inputting a detection model corresponding to the eighth coefficient matrix, and obtaining a calibration set eighth index prediction matrix composed of the predicted values of the detection indexes of the calibration set;

a fifteenth prediction unit, taking a verification set first feature-level fusion matrix formed by feature-level fusion of the NIR spectrum variable screening matrix and the MIR spectrum variable screening matrix of the verification set as the input matrix, and inputting the detection model corresponding to the seventh coefficient matrix to obtain a verification set seventh index prediction matrix composed of the predicted values of the detection indexes of the verification set;

a sixteenth prediction unit, taking a verification set second feature-level fusion matrix formed by data-level fusion of the preprocessing NIR spectrum variable screening matrix and the preprocessing MIR spectrum variable screening matrix of the verification set as the input matrix, and inputting the detection model corresponding to the eighth coefficient matrix to obtain a verification set eighth index prediction matrix composed of the predicted values of the detection indexes of the verification set;

a third verification unit, respectively obtaining a seventh verification value and an eighth verification value according to the verification indexes through the verification set seventh index prediction matrix, the verification set eighth index prediction matrix and the index matrix;

a verification value screening unit, screening the first verification value to the eighth verification value according to the threshold value range, and screening out a verification value group within the threshold value range; and a ninth training unit, carrying out decision-level fusion on a calibration set index matrix corresponding to the verification value group to obtain a calibration set decision-level fusion matrix, inputting the calibration set decision-level fusion matrix and the calibration set index matrix into the detection model, and training the detection model to obtain a ninth coefficient matrix, where the ninth coefficient matrix is a trained coefficient matrix;

where the detection module includes:

a data-level fusion unit, performing the data-level fusion on the NIR spectrum matrix and the MIR spectrum matrix of the substance to be detected to obtain a spectral fusion matrix;

a prediction unit, inputting a spectral fusion matrix obtained by the data-level fusion unit as the input matrix into a trained detection model to obtain a first index matrix as the output matrix; and taking the first index matrix as a detection result of detection indexes of the substance to be detected; and where the index matrix is a matrix composed of index values of detection indexes determined by a standard method; the first index matrix is a matrix composed of index values of detection indexes predicted by the detection model; and the detection indexes include one or more of a flash point, a pour point, density and kinematic viscosity.

Optionally, the detection module further includes:

a decision-level fusion unit, inputting the NIR spectrum matrix of the substance to be detected as the input matrix into the trained detection model to obtain a second index matrix as the output matrix; inputting the MIR spectrum matrix of the substance to be detected as the input matrix into the trained detection model to obtain a third index matrix as the output matrix; and performing the decision-level fusion on the first index matrix, the second index matrix and the third index matrix to obtain a fourth index matrix;

where the prediction unit inputs the fourth index matrix of the decision-level fusion unit as the input matrix into the trained detection model to obtain a fifth index matrix as the output matrix; and taking the fifth index matrix as the detection result of the detection indexes of the substance to be detected; and where the second index matrix, the third index matrix and the fifth index matrix are matrices composed of the index values of the detection indexes predicted by the detection model.

According to the third aspect of the present disclosure, the present disclosure also provides a computer-readable storage medium. The computer-readable storage medium includes a program based on multi-spectral data fusion, where when the program based on the multi-spectral data fusion is executed by a processor, steps of the detection method based on the multi-spectral data fusion are realized.

According to the fourth aspect of the present disclosure, the present disclosure also provides an electronic device, including a memory and a processor, where the memory includes a program based on multi-spectral data fusion, where when the program based on the multi-spectral data fusion is executed by the processor, steps of the detection method based on the multi-spectral data fusion are realized.

The near infrared and mid infrared spectral fusion technology of the present disclosure may simultaneously obtain the combined information of fundamental frequency, frequency doubling and frequency combining of hydrogen-containing groups, and train the detection model in a multi-level fusion mode of data-level fusion, feature-level fusion and decision-level fusion, so that more comprehensive, more reliable and richer chemical information of the training sample may be obtained, and the comprehensiveness, accuracy and reliability of the trained detection model are improved. The NIR spectrum and MIR spectrum of the substance to be detected are fused to predict the detection indexes through the trained detection model, which ensures the comprehensiveness, accuracy and reliability of the collection of the substance to be detected and the training of the detection model, thus ensuring the accuracy of the detection index prediction.

The realization, functional characteristics and advantages of the present disclosure will be further described with reference to the attached drawings in combination with embodiments.

DETAILED DESCRIPTION OF THE EMBODIMENTS

It should be understood that the specific embodiments described here are only used to explain the disclosure, and are not used to limit the disclosure.

Figure 1:
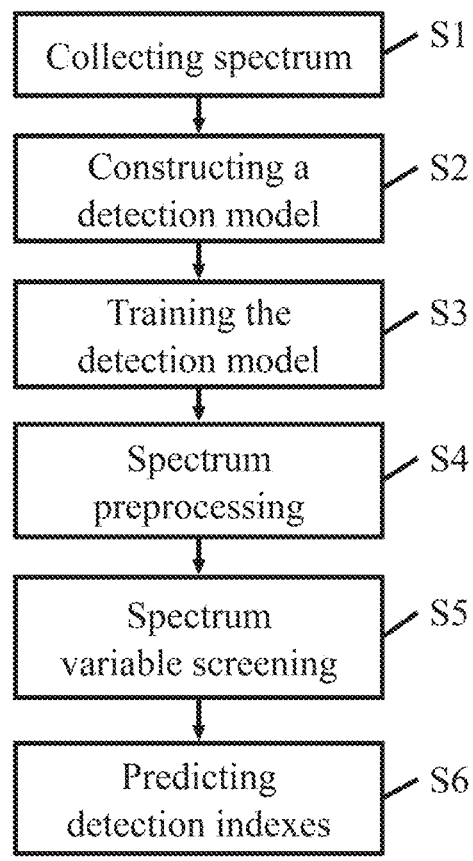
FIG. 1 is a schematic diagram of a detection method based on multi-spectral data fusion according to the present disclosure.

FIG. 1 is a schematic diagram of the detection method based on multi-spectral data fusion according to the present disclosure, as shown in FIG. 1, the detection method includes:

step S1, collecting spectrum: collecting NIR spectrum and MIR spectrum of a substance to be detected to obtain a NIR spectrum matrix and a MIR spectrum matrix of the substance to be detected;

step S2, constructing a detection model by the following formula (1);

$$Y = XP^T BQ \qquad (1),$$

where X is an input matrix, Y is an output matrix, B is a coefficient matrix, and P and Q are load matrices of X and Y respectively;

step S3, training the detection model; and step S6, predicting detection indexes. The NIR spectrum matrix and MIR spectrum matrix of the substance to be detected are fused and input into the trained detection model, and the index values of the detection indexes of the substance to be detected are output. The detection indexes include one or more of a flash point, a pour point, density and kinematic viscosity.

In some embodiments of the disclosure, step S3 includes:

step S301, constructing training sets, where the training sets include NIR spectrum and MIR spectrum of a plurality of the training samples and index values of detection indexes of the plurality of the training samples;

step S302, dividing the training sets into a calibration set and a verification set to obtain a NIR spectrum matrix, a MIR spectrum matrix and an index matrix of the calibration set and a NIR spectrum matrix, a MIR spectrum matrix and an index matrix of the verification set;

step S303, performing spectrum preprocessing on NIR spectrum and MIR spectrum of the calibration set and the verification set respectively to obtain a NIR spectrum preprocessing matrix and a MIR spectrum preprocessing matrix of the calibration set, and a NIR spectrum preprocessing matrix and a MIR spectrum preprocessing matrix of the verification set, where the spectrum preprocessing includes derivative processing or/and VN processing, and the derivative processing includes first-order derivative processing or/and higher-order derivative processing;

step S304, performing spectrum variable screening processing on the NIR spectrum, the MIR spectrum, NIR spectrum after the spectrum preprocessing and MIR spectrum after the spectrum preprocessing of the calibration set and the verification set respectively to obtain a NIR spectrum variable screening matrix, a MIR spectrum variable screening matrix, a preprocessing NIR spectrum variable screening matrix and a preprocessing MIR spectrum variable screening matrix of the calibration set, and a NIR spectrum variable screening matrix, a MIR spectrum variable screening matrix, a preprocessing NIR spectrum variable screening matrix and a preprocessing MIR spectrum variable screening matrix of the verification set, where the spectrum variable screening processing includes CARS processing or/and VIP processing;

step S305, inputting the NIR spectrum matrix and the index matrix of the calibration set into the detection model, and training the detection model to obtain a first coefficient matrix;

step S306, inputting the MIR spectrum matrix and the index matrix of the calibration set into the detection model, and training the detection model to obtain a second coefficient matrix;

step S307, inputting the NIR spectrum preprocessing matrix and the index matrix of the calibration set into the detection model, and training the detection model to obtain a third coefficient matrix;

step S308, inputting the MIR spectrum preprocessing matrix and the index matrix of the calibration set into the detection model, and training the detection model to obtain a fourth coefficient matrix;

step S309, inputting the NIR spectrum matrix of the calibration set into a detection model corresponding to the first coefficient matrix to obtain a calibration set first index prediction matrix composed of predicted values of detection indexes of the calibration set;

step S310, inputting the MIR spectrum matrix of the calibration set into a detection model corresponding to the second coefficient matrix to obtain a calibration set second index prediction matrix composed of the predicted values of the detection indexes of the calibration set;

step S311, inputting the NIR spectrum preprocessing matrix of the calibration set into a detection model corresponding to the third coefficient matrix to obtain a calibration set third index prediction matrix composed of the predicted values of the detection indexes of the calibration set;

step S312, inputting the MIR spectrum preprocessing matrix of the calibration set into a detection model corresponding to the fourth coefficient matrix to obtain a calibration set fourth index prediction matrix composed of the predicted values of the detection indexes of the calibration set;

step S313, inputting the NIR spectrum matrix of the verification set into the detection model corresponding to the first coefficient matrix to obtain a verification set first index prediction matrix composed of predicted values of detection indexes of the verification set;

step S314, inputting the MIR spectrum matrix of the verification set into the detection model corresponding to the second coefficient matrix to obtain a verification set second index prediction matrix composed of the predicted values of the detection indexes of the verification set;

step S315, inputting the NIR spectrum preprocessing matrix of the verification set into the detection model corresponding to the third coefficient matrix to obtain a verification set third index prediction matrix composed of the predicted values of the detection indexes of the verification set;

step S316, inputting the MIR spectrum preprocessing matrix of the verification set into the detection model corresponding to the fourth coefficient matrix to obtain a verification set fourth index prediction matrix composed of the predicted values of the detection indexes of the verification set;

step S317, obtaining a first verification value, a second verification value, a third verification value and a fourth verification value respectively according to verification indexes through the verification set first index prediction matrix, the verification set second index prediction matrix, the verification set third index prediction matrix, the verification set fourth index prediction matrix and the index matrix, where the verification indexes are used for representing prediction performance of the detection model, and optionally, the verification indexes include the determination coefficient or/and the RMSEP;

step S318, taking an optimal value of the first verification value, the second verification value, the third verification value and the fourth verification value as an optimal verification value, taking the optimal verification value as a threshold value, and taking a range of the threshold value in a direction of improving the prediction performance of the detection model as a threshold value range, where optionally, the optimal verification value is a minimum value of the RMSEP or/and a maximum value of the determination coefficient; and the threshold value range is not greater than the minimum value of the RMSEP or/and not less than the maximum value of the determination coefficient;

step S319, performing data-level fusion on the NIR spectrum matrix and the MIR spectrum matrix of the calibration set to form a calibration set first data-level fusion matrix, and inputting the calibration set first data-level fusion matrix and the index matrix of the calibration set into the detection model to train the detection model to obtain a fifth coefficient matrix;

step S320, performing the data-level fusion on the NIR spectrum preprocessing matrix and the MIR spectrum preprocessing matrix of the calibration set to form a calibration set second data-level fusion matrix, and inputting the calibration set second data-level fusion matrix and the index matrix of the calibration set into the detection model to train the detection model to obtain a sixth coefficient matrix;

step S321, taking the calibration set first data-level fusion matrix as the input matrix, inputting a detection model corresponding to the fifth coefficient matrix, and obtaining a calibration set fifth index prediction matrix composed of the predicted values of the detection indexes of the calibration set;

step S322, taking the calibration set second data-level fusion matrix as the input matrix, inputting a detection model corresponding to the sixth coefficient matrix, and obtaining a calibration set sixth index prediction matrix composed of the predicted values of the detection indexes of the verification set;

step S323, taking a verification set first data-level fusion matrix formed by data-level fusion of the NIR spectrum matrix and the MIR spectrum matrix of the verification set as the input matrix, and inputting the detection model corresponding to the fifth coefficient matrix to obtain a verification set fifth index prediction matrix composed of the predicted values of the detection indexes of the verification set;

step S324, taking a verification set second data-level fusion matrix formed by data-level fusion of the NIR spectrum preprocessing matrix and the MIR spectrum preprocessing matrix of the verification set as the input matrix, and inputting the detection model corresponding to the sixth coefficient matrix to obtain a verification set sixth index prediction matrix composed of the predicted values of the detection indexes of the verification set;

step S325, respectively obtaining a fifth verification value and a sixth verification value according to the verification indexes through the verification set fifth index prediction matrix, the verification set sixth index prediction matrix and the index matrix;

step S326, performing feature-level fusion on the NIR spectrum variable screening matrix and the MIR spectrum variable screening matrix of the calibration set to form a calibration set first feature-level fusion matrix, inputting the calibration set first feature-level fusion matrix and the index matrix of the calibration set into the detection model, and training the detection model to obtain a seventh coefficient matrix;

step S327, performing the feature-level fusion on the preprocessing NIR spectrum variable screening matrix and the preprocessing MIR spectrum variable screening matrix of the calibration set to form a calibration set second feature-level fusion matrix, inputting the calibration set second feature-level fusion matrix and the index matrix of the calibration set into the detection model, and training the detection model to obtain an eighth coefficient matrix;

step S328, taking the calibration set first feature-level fusion matrix as the input matrix, inputting a detection model corresponding to the seventh coefficient matrix, and obtaining a calibration set seventh index prediction matrix composed of the predicted values of the detection indexes of the calibration set;

step S329, taking the calibration set second feature-level fusion matrix as the input matrix, inputting a detection model corresponding to the eighth coefficient matrix, and obtaining a calibration set eighth index prediction matrix composed of the predicted values of the detection indexes of the calibration set;

step S330, taking a verification set first feature-level fusion matrix formed by feature-level fusion of the NIR spectrum variable screening matrix and the MIR spectrum variable screening matrix of the verification set as the input matrix, and inputting the detection model corresponding to the seventh coefficient matrix to obtain a verification set seventh index prediction matrix composed of the predicted values of the detection indexes of the verification set;

step S331, taking a verification set second feature-level fusion matrix formed by data-level fusion of the preprocessing NIR spectrum variable screening matrix and the preprocessing MIR spectrum variable screening matrix of the verification set as the input matrix, and inputting the detection model corresponding to the eighth coefficient matrix to obtain a verification set eighth index prediction matrix composed of the predicted values of the detection indexes of the verification set;

step S332, respectively obtaining a seventh verification value and an eighth verification value according to the verification indexes through the verification set seventh index prediction matrix, the verification set eighth index prediction matrix and the index matrix;

step S333, screening the first verification value to the eighth verification value according to the threshold value range, and screening out a verification value group within the threshold value range; and step S334, carrying out decision-level fusion on a calibration set index matrix corresponding to the verification value group to obtain a calibration set decision-level fusion matrix, inputting the calibration set decision-level fusion matrix and the calibration set index matrix into the detection model, and training the detection model to obtain a ninth coefficient matrix, where the ninth coefficient matrix is a trained coefficient matrix.

Among them, the index matrix is a matrix composed of index values of detection indexes determined by a standard method.

The disclosure constructs an optimized decision-level data fusion method. Under various spectrum preprocessing conditions, the single spectrum model with the lowest prediction error is taken as the control group, and the prediction results of single spectrum model, data-level fusion model and feature-level fusion model are fused to establish a decision-level fusion model, which may effectively improve the prediction performance of the model.

In some embodiments of the disclosure, step S302 includes:

randomly dividing the calibration set and the verification set in the training sets according to a ratio of 2:1-4:1. Optionally, the calibration set and verification set are randomly divided in the training sets according to the ratio of 3:1. If the ratio is not within the above range, the calibration set will be too large and the verification set will be too small, or the calibration set will be too small and the verification set will be too large, because the calibration set is used to train the model and the verification set is used to verify the prediction performance of the model, both of which will lead to the larger prediction error when the model determines the verification set.

In some embodiments of the present disclosure, step S4 includes:

performing the data-level fusion on the NIR spectrum matrix and the MIR spectrum matrix of the substance to be detected to obtain a spectral fusion matrix;

inputting a spectral fusion matrix of the substance to be detected as the input matrix into a trained detection model to obtain a first index matrix as the output matrix; and taking the first index matrix as a detection result of detection indexes of the substance to be detected; and where the first index matrix is a matrix composed of index values of detection indexes predicted by the detection model.

In some embodiments of the present disclosure, step S6 includes:

performing the data-level fusion on the NIR spectrum matrix and the MIR spectrum matrix of the substance to be detected to obtain a spectral fusion matrix;

inputting a spectral fusion matrix of the substance to be detected as the input matrix into a trained detection model to obtain a first index matrix as the output matrix;

inputting the NIR spectrum matrix of the substance to be detected as the input matrix into the trained detection model to obtain a second index matrix as the output matrix;

inputting the MIR spectrum matrix of the substance to be detected as the input matrix into the trained detection model to obtain a third index matrix as the output matrix;

performing the decision-level fusion on the first index matrix, the second index matrix and the third index matrix to obtain a fourth index matrix;

inputting the fourth index matrix as the input matrix into the trained detection model to obtain a fifth index matrix as the output matrix; and taking the fifth index matrix as the detection result of the detection indexes of the substance to be detected; and where the second index matrix, the third index matrix and the fifth index matrix are matrices composed of the index values of the detection indexes predicted by the detection model.

In some embodiments of the present disclosure, before step S6, it includes:

step S4, spectrum preprocessing: performing baseline correction on the NIR spectrum and the MIR spectrum of the substance to be detected, and eliminating the phenomenon of spectral baseline deviation caused by factors such as instruments, sample backgrounds and the like.

In some embodiments of the present disclosure, step S4 includes:

performing the spectrum preprocessing on spectral data of the NIR spectrum of the substance to be detected to form a first spectrum matrix;

performing the spectrum preprocessing on spectral data of the MIR spectrum of the substance to be detected to form a second spectrum matrix; and where the spectrum preprocessing includes the derivative processing or/and the VN processing, and the derivative processing includes the first-order derivative processing or/and the higher-order derivative processing.

In some embodiments of the present disclosure, step S6 includes:

performing the data-level fusion on the first spectrum matrix and the second spectrum matrix to form a first fusion matrix;

inputting the first spectrum matrix as the input matrix into the trained detection model to obtain a sixth index matrix as the output matrix;

inputting the second spectrum matrix as the input matrix into the trained detection model to obtain a seventh index matrix as the output matrix;

inputting the first fusion matrix as the input matrix into the trained detection model to obtain an eighth index matrix as the output matrix;

performing the decision-level fusion on the sixth index matrix, the seventh index matrix and the eighth index matrix to obtain the fourth index matrix; and inputting the fourth index matrix as the input matrix into the trained detection model to obtain a fifth index matrix as the output matrix; and taking the fifth index matrix as the detection result of the detection indexes of the substance to be detected.

In some embodiments of the present disclosure, before step S6, it includes:

step S5, spectrum variable screening: performing the spectrum variable screening processing on the NIR spectrum and the MIR spectrum of the substance to be detected respectively to form a third spectrum matrix and a fourth spectrum matrix; and where the spectrum variable screening processing includes the VIP processing.

In some embodiments of the present disclosure, step S6 includes:

performing the feature-level fusion on the third spectrum matrix and the fourth spectrum matrix to form a second fusion matrix;

inputting the third spectrum matrix as the input matrix into the trained detection model to obtain a ninth index matrix as the output matrix;

inputting the fourth spectrum matrix as the input matrix into the trained detection model to obtain a tenth index matrix as the output matrix;

inputting the second fusion matrix as the input matrix into the trained detection model to obtain an eleventh index matrix as the output matrix;

performing the decision-level fusion on the ninth index matrix, the tenth index matrix and the eleventh index matrix to obtain a fourth index matrix; and inputting the fourth index matrix as the input matrix into the trained detection model to obtain a fifth index matrix as the output matrix; and taking the fifth index matrix as the detection result of the detection indexes of the substance to be detected.

In some embodiments of the present disclosure, before step S6, it includes:

step S4, the spectrum preprocessing: performing the spectrum preprocessing on spectral data of the NIR spectrum of the substance to be detected to form a first spectrum matrix;

performing the spectrum preprocessing on spectral data of the MIR spectrum of the substance to be detected to form a second spectrum matrix; and where the spectrum preprocessing includes the derivative processing or/and the VN processing, and the derivative processing includes the first-order derivative processing or/and the higher-order derivative processing; and step S5, spectrum variable screening: performing the spectrum variable screening processing on the first spectrum matrix and the second spectrum matrix of the substance to be detected respectively to form a fifth spectrum matrix and a sixth spectrum matrix; and where the spectrum variable screening processing includes the VIP processing.

In some embodiments of the present disclosure, step S6 includes:

performing the data-level fusion on the first spectrum matrix and the second spectrum matrix to form a first fusion matrix;

performing the feature-level fusion on the fifth spectrum matrix and the sixth spectrum matrix to form a third fusion matrix;

inputting the first spectrum matrix as the input matrix into the trained detection model to obtain a sixth index matrix as the output matrix;

inputting the second spectrum matrix as the input matrix into the trained detection model to obtain a seventh index matrix as the output matrix;

inputting the first fusion matrix as the input matrix into the trained detection model to obtain an eighth index matrix as the output matrix;

inputting the third fusion matrix as the input matrix into the trained detection model to obtain a twelfth index matrix as the output matrix;

performing the decision-level fusion on the sixth index matrix, the seventh index matrix, the eighth index matrix, and the twelfth index matrix to obtain a fourth index matrix; and inputting the fourth index matrix as the input matrix into the trained detection model to obtain a fifth index matrix as the output matrix; and taking the fifth index matrix as the detection result of the detection indexes of the substance to be detected.

In some embodiments of the disclosure, step S3 includes:

collecting the training samples to construct the training sets, where the training sets include the NIR spectrum and the MIR spectrum of the plurality of the training samples and the index values of the detection indexes of the plurality of the training samples;

dividing the training sets into the calibration set and the verification set to obtain the NIR spectrum matrix, the MIR spectrum matrix and the index matrix of the calibration set and the NIR spectrum matrix, the MIR spectrum matrix and the index matrix of the verification set;

performing the spectrum preprocessing on the NIR spectrum and the MIR spectrum of the calibration set and the verification set respectively to obtain the NIR spectrum preprocessing matrix and the MIR spectrum preprocessing matrix of the calibration set, and the NIR spectrum preprocessing matrix and the MIR spectrum preprocessing matrix of the verification set, where the spectrum preprocessing includes the derivative processing or/and the VN processing, and the derivative processing includes the first-order derivative processing or/and the higher-order derivative processing;

performing the spectrum variable screening processing on the NIR spectrum after the spectrum preprocessing and the MIR spectrum after the spectrum preprocessing of the calibration set and the verification set respectively to obtain the preprocessing NIR spectrum variable screening matrix and the preprocessing MIR spectrum variable screening matrix of the calibration set, and the preprocessing NIR spectrum variable screening matrix and the preprocessing MIR spectrum variable screening matrix of the verification set, where the spectrum variable screening processing includes the CARS processing or/and the VIP processing;

inputting the NIR spectrum preprocessing matrix and the index matrix of the calibration set into the detection model, and training the detection model to obtain the third coefficient matrix;

inputting the MIR spectrum preprocessing matrix and the index matrix of the calibration set into the detection model, and training the detection model to obtain the fourth coefficient matrix;

inputting the NIR spectrum preprocessing matrix of the calibration set into the detection model corresponding to the third coefficient matrix to obtain the calibration set third index prediction matrix composed of the predicted values of the detection indexes of the calibration set;

inputting the MIR spectrum preprocessing matrix of the calibration set into the detection model corresponding to the fourth coefficient matrix to obtain the calibration set fourth index prediction matrix composed of the predicted values of the detection indexes of the calibration set;

inputting the NIR spectrum preprocessing matrix of the verification set into the detection model corresponding to the third coefficient matrix to obtain the verification set third index prediction matrix composed of the predicted values of the detection indexes of the verification set;

inputting the MIR spectrum preprocessing matrix of the verification set into the detection model corresponding to the fourth coefficient matrix to obtain the verification set fourth index prediction matrix composed of the predicted values of the detection indexes of the verification set;

obtaining the third verification value and the fourth verification value respectively according to the verification indexes through the verification set third index prediction matrix, the verification set fourth index prediction matrix and the index matrix, where the verification indexes are used for representing the prediction performance of the detection model, and optionally, the verification indexes include a determination coefficient or/and a RMSEP;

taking an optimal value of the third verification value and the fourth verification value as the optimal verification value, taking the optimal verification value as the threshold value, and taking the range of the threshold value in the direction of improving the prediction performance of the detection model as the threshold value range, where optionally, the optimal verification value is a minimum value of a RMSEP or/and a maximum value of a determination coefficient; and the threshold value range is not greater than the minimum value of the RMSEP or/and not less than the maximum value of the determination coefficient;

performing the data-level fusion on the NIR spectrum preprocessing matrix and the MIR spectrum preprocessing matrix of the calibration set to form the calibration set second data-level fusion matrix, and inputting the calibration set second data-level fusion matrix and the index matrix of the calibration set into the detection model to train the detection model to obtain the sixth coefficient matrix;

taking the calibration set second data-level fusion matrix as the input matrix, inputting the detection model corresponding to the sixth coefficient matrix, and obtaining the calibration set sixth index prediction matrix composed of the predicted values of the detection indexes of the verification set;

taking the verification set second data-level fusion matrix formed by the data-level fusion of the NIR spectrum preprocessing matrix and the MIR spectrum preprocessing matrix of the verification set as the input matrix, and inputting the detection model corresponding to the sixth coefficient matrix to obtain the verification set sixth index prediction matrix composed of the predicted values of the detection indexes of the verification set;

respectively obtaining the sixth verification value according to the verification indexes through the verification set sixth index prediction matrix and the index matrix;

performing the feature-level fusion on the preprocessing NIR spectrum variable screening matrix and the preprocessing MIR spectrum variable screening matrix of the calibration set to form the calibration set second feature-level fusion matrix, inputting the calibration set second feature-level fusion matrix and the index matrix of the calibration set into the detection model, and training the detection model to obtain the eighth coefficient matrix;

taking the calibration set second feature-level fusion matrix as the input matrix, inputting the detection model corresponding to the eighth coefficient matrix, and obtaining the calibration set eighth index prediction matrix composed of the predicted values of the detection indexes of the calibration set;

taking the verification set second feature-level fusion matrix formed by the data-level fusion of the preprocessing NIR spectrum variable screening matrix and the preprocessing MIR spectrum variable screening matrix of the verification set as the input matrix, and inputting the detection model corresponding to the eighth coefficient matrix to obtain the verification set eighth index prediction matrix composed of the predicted values of the detection indexes of the verification set;

respectively obtaining the eighth verification value according to the verification indexes through the verification set eighth index prediction matrix and the index matrix;

screening the third verification value, the fourth verification value, the sixth verification value, and the eighth verification value according to the threshold value range, and screening out the verification value group within the threshold value range; and carrying out the decision-level fusion on the calibration set index matrix corresponding to the verification value group to obtain the calibration set decision-level fusion matrix, inputting the calibration set decision-level fusion matrix and the calibration set index matrix into the detection model, and training the detection model to obtain the ninth coefficient matrix, where the ninth coefficient matrix is the trained coefficient matrix.

Obtaining the chemical information of the substance to be detected by single spectrum is one-sided, and it is impossible to obtain more comprehensive, reliable and abundant chemical information, which leads to the low prediction performance of single spectrum model. The disclosure may effectively improve the prediction performance of the model through data fusion. At the same time, taking the single spectrum model with the best prediction performance as the control group, and using the results of data-level fusion model and feature-level fusion model superior to this model to establish an optimized decision-level fusion model, the prediction accuracy of the model may be effectively improved.

In some embodiments of the present disclosure, in the steps of training the detection model, there are the various spectrum preprocessing or/and the spectrum variable screening processing, and training the training model by using each spectrum preprocessing, each spectrum variable screening processing and a combination of the each spectrum preprocessing and the spectrum variable screening processing.

In some embodiments of the present disclosure, in step S3, the RMSEP is obtained by the following formula (2), and the determination coefficient ($R_P^2$) is obtained by the following formula (3). The closer the RMSEP value is to 0, the closer the $R_P^2$ value is to 1, which proves that the prediction performance of the detection model is higher, and optionally, the optimal verification value is the smallest RMSEP and the largest determination coefficient:

$$RMSEP = \sqrt{\frac{1}{g}\sum_{1}^{g}(y_{pred} - y_{act})^2}, \quad (2)$$

$$R^2 = 1 - \frac{\sum_{1}^{g}(y_{pred} - y_{act})^2}{\sum_{1}^{g}(y_{pred} - y_{mean})^2}, \quad (3)$$

Among them, $y_{act}$ and $y_{pred}$ are the measured value (index value of detection index measured by standard method) and the predicted value (predicted value of detection index output by detection model) of detection index of each training sample of the verification set respectively, $y_{mean}$ is the average of the measured values of the detection indexes of multiple training samples in the verification set, and g is the total number of training samples in the verification set.

In some embodiments of the present disclosure, in step S2, a detection model is constructed by a PLS method, and the step of constructing the detection model by PLS method includes:

decomposing independent variable X matrix and dependent variable Y matrix:

$$Y = UQ^T + E_Y \quad (4),$$

$$X = TP^T + E_X \quad (5),$$

where T and U are the score matrices of independent variable X and dependent variable Y respectively; P and Q are load matrices of X and Y; and $E_X$ and $E_Y$ are the PLS fitting residual matrices of X and Y respectively;

performing linear regression analysis on the score matrices T and U:

$$U = TB \quad (6),$$

$$B = (T^T T)^{-1} T^T Y \quad (7); \text{ and}$$

determining the linear relationship between X and Y:

$$Y = XP^T BQ \quad (1).$$

In some embodiments of the present disclosure, spectrum preprocessing includes one or more of the following steps.

The NIR spectrum and the MIR spectrum are subjected to first-order derivative processing by the following formula (8). The first-order derivative processing uses numerical differentiation method to calculate the slope or change rate of spectral data, so as to highlight the peaks or valleys in spectral data and amplify the feature signals of the spectrum:

$$\frac{dA}{d\lambda} = \frac{A_{i+1} - A_i}{\Delta\lambda}. \quad (8)$$

Among them, A is the spectral value, which is the absorbance or/and light intensity, $\lambda$ is the wavelength or wavenumber, i is the wavelength or wavenumber index, and $\Delta\lambda$ represents the distance between two adjacent wavelengths or wavenumbers.

The NIR spectrum and the MIR spectrum are subjected to second-order derivative processing by the following formula (9). The second-order derivative processing calculates the change rate of curvature or change rate of spectral data by taking the derivative of the first-order derivative again, so as to highlight the broad peaks and plateaus in spectral data:

$$\frac{d^2 A}{d\lambda^2} = \frac{A_{i+1} - 2A_i + A_{i-1}}{\Delta\lambda^2}. \quad (9)$$

By combining the following formula (10) and formula (8), SG first-order derivative processing is performed on the NIR spectrum and the MIR spectrum:

$$A_{k,smooth} = \overline{A}_k = \frac{1}{H}\sum_{i=-w}^{+w} A_{k+i} h_i. \quad (10)$$

Among them, 2c+1 is the smoothing window width, hi is the derivative coefficient (SG derivative coefficient table needs to be consulted according to different window widths), H is the normalization factor, k is the center point of the smoothing window, $\overline{A_k}$ is the average of the measured values of c points before and after, and $A_{k,smooth}$ is the smoothed value of the spectral value after SG smoothing processing.

By combining the following formula (10) and formula (9), SG second-order derivative processing is performed on the NIR spectrum and the MIR spectrum.

The NIR spectrum and the MIR spectrum are vector normalized by the following formula (11), and the VN unifies the scales of spectral data, so as to prevent the excessive difference of spectral data in different wavenumbers from negatively optimizing the model:

$$A_{normalization} = \frac{A - \overline{A}}{\sqrt{\sum_{i=1}^{m} A_i^2}}. \tag{11}$$

Among them, A is a spectrum matrix with a dimension of 1×m, and m is the total number of wavelengths or wavenumbers;

$$\overline{A} = \frac{\sum_{i=1}^{m} A_i}{m};$$

and $A_{normalization}$ is the spectral value after VN.

In some embodiments of the present disclosure, in step S3, the CARS processing in the spectrum variable screening processing includes:

sampling N times by Monte Carlo sampling method, establishing the PLS model (detection model) by the spectrum matrix A (n×m) and the detection index matrix Y (n×1) to be detected, and obtaining the regression coefficient b. At the time of the j-th sampling, the retention rate $r_j$ of each spectrum variable is determined by the following formula (12):

$$r_j = \alpha e^{-fj} \tag{12}.$$

Among them, $$\alpha = \left(\frac{m}{2}\right)^{\frac{1}{N-1}}, f = \frac{\ln\left(\frac{m}{2}\right)}{N-1},$$

and n is the total number of training samples in the calibration set.

Through CARS, the wavelength points with large absolute value of regression coefficient in PLS model are screened out, and the wavelength points with small weight are removed. Finally, the subset with the lowest cross-verification root mean square error (RMSECV) value is selected, and the selection of optimal spectrum variable combination is realized. The NIR and MIR feature variables screened by CARS are matrices $C_{NIR}$ and $C_{MIR}$, and RMSECV is given by the following formula (13):

$$RMSECV = \sqrt{\frac{1}{n}\sum_{1}^{n}(y_{pred} - y_{act})^2}. \tag{13}$$

Among them, $y_{act}$ and $y_{pred}$ are the measured values (for example, the measured values of detection indexes determined by standard methods in the national standard) of detection indexes determined by standard methods for each training sample and the predicted values output by the detection model respectively, and $y_{mean}$ is the average value of the measured values.

In some embodiments of the present disclosure, in step S3, the steps of the VIP processing in the spectrum variable screening processing include:

obtaining the vector score by the following formula (14):

$$VIP_l = \sqrt{\frac{m\sum_{h=1}^{H}\left(q_h^2 t_h^T t_h \left(\frac{w_{th}}{\|w_h\|}\right)^2\right)}{\sum_{h=1}^{H} q_h^3 t_h^T t_h}}. \tag{14}$$

Among them, H is the total number of PLS best principal factors, and h is the PLS best principal factor index; w is the weight vector; t is the score vector; q is the load vector; and $VIP_i$ is the VIP value of the vector corresponding to the i-th wavenumber or wavelength, and the importance of spectrum variables to the substance to be detected is judged by VIP value. When the VIP value is large, it means that the spectrum variable has strong explanatory power to the dependent variable.

The NIR spectrum and MIR spectrum corresponding to the wavelength or wavenumber with VIP value greater than 1 are selected as feature spectra, and the NIR and MIR feature variables screened by VIP value are $V_{NIR}$ and $V_{MIR}$.

In the above embodiments, the methods for data-level fusion, feature-level fusion and decision-level fusion include: splicing the same-dimension matrices to perform data-level fusion, feature-level fusion or decision-level fusion.

Figure 2:
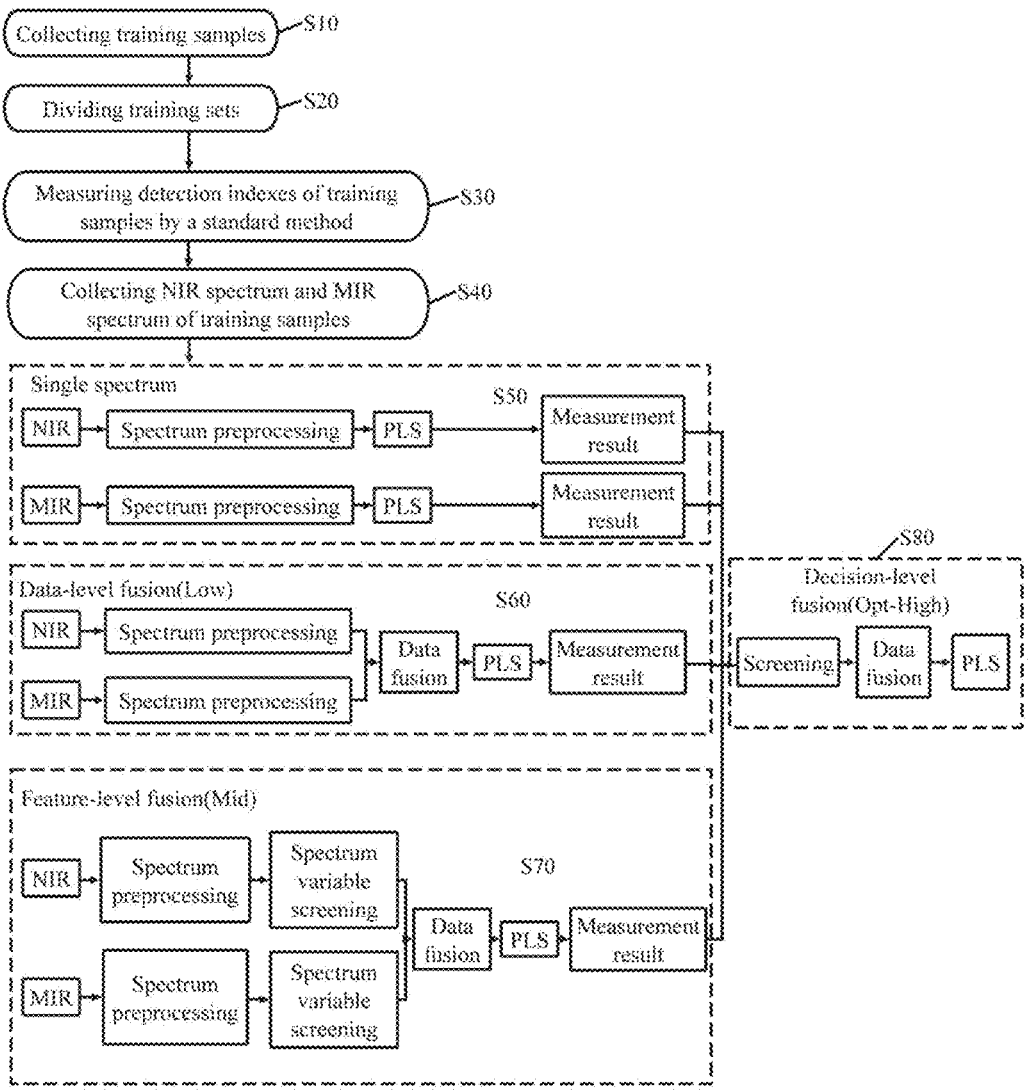
FIG. 2 is a schematic diagram of a preferred embodiment of the steps of training a detection model according to the present disclosure.

FIG. 2 is a schematic diagram of a preferred embodiment of the steps of training the detection model according to the present disclosure. As shown in FIG. 2, the steps of training the detection model include:

step S10, collecting multiple training samples to form a training set;

step S20, randomly dividing the training set according to a set ratio to form a calibration set and a verification set respectively; and optionally, where the set ratio is 3:1;

step S30, measuring the detection indexes of the training samples of the calibration set and the verification set by a standard method to form dependent variable matrices (index matrices) $YZ_C$ and $YZ_V$ of the calibration set and the verification set;

step S40, collecting NIR spectrum and MIR spectrum of calibration set and verification set to obtain NIR spectrum matrix $N_C$ and MIR spectrum matrix $M_C$ of calibration set, and NIR spectrum matrix $N_V$ and MIR spectrum matrix $M_V$ of verification set samples;

step S50, under various spectrum preprocessing conditions, establishing a single spectrum model by using the matrix $N_C$ and the matrix $M_C$ of the calibration set respectively, and making the prediction by using the verification set, including:

performing various spectrum preprocessing on the NIR spectrum matrix $N_C$ and the MIR spectrum matrix $M_C$ of the calibration set to obtain the NIR spectrum preprocessing matrix $N_{pre-C}$ and the MIR spectrum preprocessing matrix $M_{pre-C}$ of the calibration set after spectrum preprocessing;

where the NIR spectrum preprocessing matrix $N_{pre-C}$ and MIR spectrum preprocessing matrix $M_{pre-C}$ of the calibration set establish a single spectrum model through formulas (2)-(4), as shown in formula (1), and the input matrix X is a single spectrum matrix $N_{pre-C}$ or $M_{pre-C}$;

inputting a NIR spectrum preprocessing matrix $N_{pre-C}$ and a MIR spectrum preprocessing matrix $M_{pre-C}$ of the calibration set into a single spectrum model to obtain a detection index prediction matrix $YC_{N-pred}$ of the NIR spectrum and a detection index prediction matrix $YC_{M-pred}$ of the MIR spectrum of the calibration set;

performing various spectrum preprocessing on the NIR spectrum matrix $N_V$ and the MIR spectrum matrix $M_V$ of the verification set to obtain the NIR spectrum preprocessing matrix $N_{pre-V}$ and the MIR spectrum preprocessing matrix $M_{pre-V}$ of the verification set after spectrum preprocessing;

inputting a NIR spectrum preprocessing matrix $N_{pre-V}$ and a MIR spectrum preprocessing matrix $M_{pre-V}$ of the verification set into a single spectrum model to obtain a detection index prediction matrix $YV_{N-pred}$ of the NIR spectrum and a detection index prediction matrix $YV_{M-pred}$ of the MIR spectrum of the verification set; and where through the dependent variable matrix (index matrix) $YZ_V$ of the verification set and the detection index prediction matrix $YV_{N-pred}$ of the NIR spectrum, the determination coefficient ($R_P^2$) and the RMSEP are analyzed according to formula (2) and formula (3) to obtain the third verification value group; and through the dependent variable matrix (index matrix) $YZ_V$ of the verification set and the detection index prediction matrix $YV_{M-pred}$ of the MIR spectrum, the determination coefficient ($R_P^2$) and the RMSEP are analyzed according to formula (2) and formula (3) to obtain the fourth verification value group.

In step S60, the NIR spectrum preprocessing matrix $N_{pre-C}$ and the MIR spectrum preprocessing matrix $M_{pre-C}$ of the calibration set are fused at the data level, a data-level fusion model (Low) is established by using the data-level fusion matrix of the calibration set, and prediction is made by using the verification set. The specific steps are as follows:

obtaining the data-level fusion matrix $L_{pre-C}$ of the calibration set by splicing the NIR spectrum preprocessing matrix $N_{pre-C}$ and the MIR spectrum preprocessing matrix $M_{pre-C}$ of the calibration set;

$$L_{pre-C}=[N_{pre-C}, M_{pre-C}];$$

where the data-level fusion matrix L of the calibration set establishes a data-level fusion model through formulas (2)-(4), as shown in formula (1), and the input matrix X is the data-level fusion matrix $L_{pre-C}$;

inputting the data-level fusion matrix $L_{pre-C}$ of the calibration set into the data-level fusion model to obtain the detection index prediction matrix $YC_{L_{pre}-pred}$ of the data-level fusion of the calibration set;

splicing the NIR spectrum preprocessing matrix $N_{pre-V}$ and the MIR spectrum preprocessing matrix $M_{pre-V}$ of the verification set to obtain the data-level fusion matrix-pre-V of the verification set;

$$L_{pre-V}=[N_{pre-V}, M_{pre-V}];$$

inputting the data-level fusion matrix $L_{pre-V}$ of the verification set into the data-level fusion model to obtain the detection index prediction matrix $YV_{L_{pre}-pred}$ of the data-level fusion of the verification set; and where through the dependent variable matrix (index matrix) $YZ_V$ of the verification set and the detection index prediction matrix $YV_{L_{pre}-pred}$ fused at the data level, the determination coefficient ($R_P^2$) and the RMSEP are analyzed according to formula (2) and formula (3) to obtain the sixth verification value group.

In step S70, under various spectrum variable screening processing methods, the NIR spectrum preprocessing matrix $N_{pre-C}$ and MIR spectrum preprocessing matrix $M_{pre-C}$ of the calibration set are subjected to feature-level fusion after feature variable screening, and a feature-level fusion model (Mid) is established by using the feature-level fusion matrix of the calibration set, and the prediction is made by using the verification set. The specific steps are as follows.

The NIR spectrum preprocessing matrix $N_{pre-C}$ and the MIR spectrum preprocessing matrix $M_{pre-C}$ of the calibration set are subjected to various spectrum variable screening processing to obtain the preprocessing NIR spectrum variable screening matrix $N_{vs-C}$ and the preprocessing MIR spectrum variable screening matrix $M_{vs-C}$ of the calibration set after various spectrum variable screening processing.

The preprocessing NIR spectrum variable screening matrix $N_{vs-C}$ and preprocessing MIR spectrum variable screening matrix $M_{vs-C}$ are spliced to obtain the feature-level fusion matrix $L_{vs-C}$ of the calibration set.

$$L_{vs-C}=[N_{vs-C}, M_{vs-C}].$$

The feature-level fusion matrix bus-C of the calibration set establishes the feature-level fusion model through formulas (2)-(4), as shown in formula (1), and the input matrix X is the feature-level fusion matrix Los-C The feature-level fusion matrix $L_{vs-C}$ of the calibration set is inputted into the feature-level fusion model to obtain the detection index prediction matrix $YC_{L_{pre}-pred}$ of the feature-level fusion of the calibration set.

The NIR spectrum preprocessing matrix $N_{pre-V}$ and the MIR spectrum preprocessing matrix $M_{pre-V}$ of the verification set are subjected to various spectrum variable screening processing to obtain the preprocessing NIR spectrum variable screening matrix $N_{vs-V}$ and the preprocessing MIR spectrum variable screening matrix $M_{vs-V}$ of the verification set after various spectrum variable screening processing.

The preprocessing NIR spectrum variable screening matrix $N_{vs-V}$ and preprocessing MIR spectrum variable screening matrix $M_{vs-V}$ are spliced to obtain the feature-level fusion matrix $L_{vs-V}$ of the verification set.

$$L_{vs-V}=[N_{vs-V}, M_{vs-V}].$$

The feature-level fusion matrix $L_{vs-V}$ of the verification set is inputted into the feature-level fusion model to obtain the detection index prediction matrix $YV_{L_{vs}-pred}$ of the feature-level fusion of the verification set.

Through the dependent variable matrix (index matrix) $YZ_V$ of the verification set and the detection index prediction matrix $YV_{N_{vz}-pred}$ fused at the feature level, the determination coefficient ($R_P^2$) and the RMSEP are analyzed according to formula (2) and formula (3) to obtain the eighth verification value group.

Step S80, the lowest RMSEP value in the third verification group and the fourth verification group of the single spectrum model with different spectrum preprocessing established in step S50 is taken as a threshold value, and the prediction results of the single spectrum model, the data-level fusion model and the feature-level fusion model with RMSEP values equal to or lower than the threshold value in steps S50, S60 and S70 are fused to obtain an optimized decision-level fusion matrix $H_{Opt}$, and the corresponding verification sets are used for prediction to obtain a ninth verification value group.

Optionally, it also includes step S90, comparing the RMSEP and $R_p^2$ values of each verification group from step S50 to step S80, and finding the detection model corresponding to the verification group with the lowest RMSEP value and the highest $R_p^2$ value as the optimal detection model, thereby obtaining the optimal coefficient matrix corresponding to the optimal detection model.

The decision-level data fusion method based on NIR spectrum and MIR spectrum of the disclosure obtains the chemical composition information of diesel oil from different dimensions, which may effectively improve the prediction accuracy of the established model for unknown samples compared with a single spectrum model.

Figure 3:
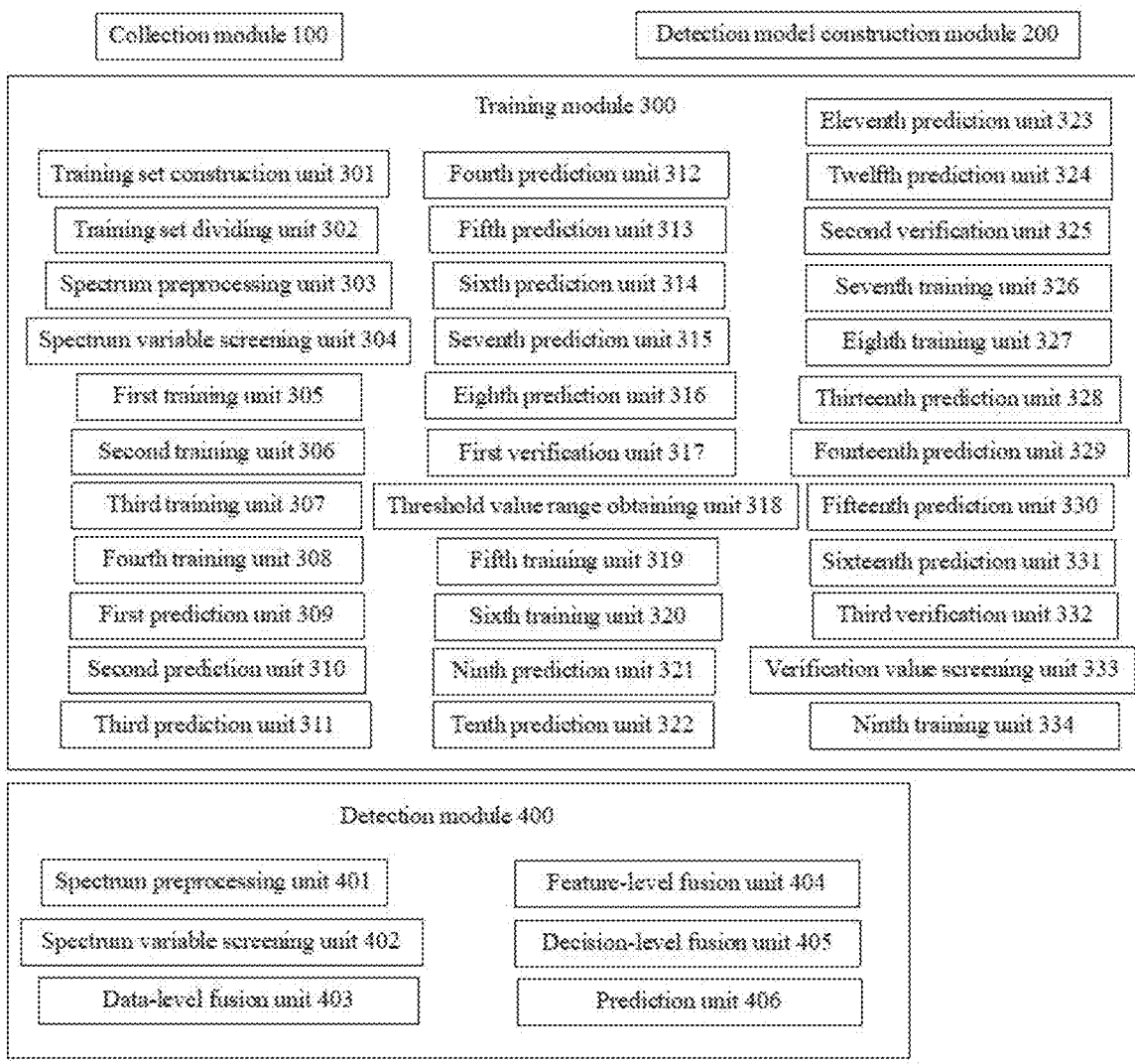
FIG. 3 is a schematic block diagram of an embodiment of the detection system based on multi-spectral data fusion according to the present disclosure.

FIG. 3 is a schematic block diagram of an embodiment of the detection system based on multi-spectral data fusion according to the present disclosure. As shown in FIG. 3, the detection system based on multi-spectral data fusion includes:

a collection module 100, collecting NIR spectrum and MIR spectrum of a substance to be detected to obtain a NIR spectrum matrix and a MIR spectrum matrix of the substance to be detected;

a detection model construction module 200, constructing a detection model by formula (1);

a training module 300, training the detection model; and a detection module 400, predicting detection indexes.

In some embodiments of the present disclosure, the training module 300 includes:

a training set construction unit 301, collecting training samples to construct training sets, where the training sets include NIR spectrum and MIR spectrum of multiple training samples and index values of detection indexes of multiple training samples;

a training set dividing unit 302, dividing the training sets constructed by the training set construction unit into a calibration set and a verification set to obtain a NIR spectrum matrix, a MIR spectrum matrix and an index matrix of the calibration set and a NIR spectrum matrix, a MIR spectrum matrix and an index matrix of the verification set;

a spectrum preprocessing unit 303, performing spectrum preprocessing on NIR spectrum and MIR spectrum of the calibration set and the verification set obtained by the training set dividing unit respectively to obtain a NIR spectrum preprocessing matrix and a MIR spectrum preprocessing matrix of the calibration set, and a NIR spectrum preprocessing matrix and a MIR spectrum preprocessing matrix of the verification set;

a spectrum variable screening unit 304, performing spectrum variable screening processing on the NIR spectrum, the MIR spectrum, NIR spectrum after the spectrum preprocessing and MIR spectrum after the spectrum preprocessing of the calibration set and the verification set obtained by the training set dividing unit respectively to obtain a NIR spectrum variable screening matrix, a MIR spectrum variable screening matrix, a preprocessing NIR spectrum variable screening matrix and a preprocessing MIR spectrum variable screening matrix of the calibration set, and a NIR spectrum variable screening matrix, a MIR spectrum variable screening matrix, a preprocessing NIR spectrum variable screening matrix and a preprocessing MIR spectrum variable screening matrix of the verification set;

a first training unit 305, inputting the NIR spectrum matrix and the index matrix of the calibration set obtained by the training set dividing unit into the detection model, and training the detection model to obtain a first coefficient matrix;

a second training unit 306, inputting the MIR spectrum matrix and the index matrix of the calibration set obtained by the training set dividing unit into the detection model, and training the detection model to obtain a second coefficient matrix;

a third training unit 307, inputting the NIR spectrum preprocessing matrix and the index matrix of the calibration set obtained by the spectrum preprocessing unit into the detection model, and training the detection model to obtain a third coefficient matrix;

a fourth training unit 308, inputting the MIR spectrum preprocessing matrix and the index matrix of the calibration set obtained by the spectrum preprocessing unit into the detection model, and training the detection model to obtain a fourth coefficient matrix;

a first prediction unit 309, inputting the NIR spectrum matrix of the calibration set obtained by the training set dividing unit into a detection model corresponding to the first coefficient matrix to obtain a calibration set first index prediction matrix composed of predicted values of detection indexes of the calibration set;

a second prediction unit 310, inputting the MIR spectrum matrix of the calibration set obtained by the training set dividing unit into a detection model corresponding to the second coefficient matrix to obtain a calibration set second index prediction matrix composed of the predicted values of the detection indexes of the calibration set;

a third prediction unit 311, inputting the NIR spectrum preprocessing matrix of the calibration set obtained by the spectrum preprocessing unit into a detection model corresponding to the third coefficient matrix to obtain a calibration set third index prediction matrix composed of the predicted values of the detection indexes of the calibration set;

a fourth prediction unit 312, inputting the MIR spectrum preprocessing matrix of the calibration set obtained by the spectrum preprocessing unit into a detection model corresponding to the fourth coefficient matrix to obtain a calibration set fourth index prediction matrix composed of the predicted values of the detection indexes of the calibration set;

a fifth prediction unit 313, inputting the NIR spectrum matrix of the verification set obtained by the training set dividing unit into the detection model corresponding to the first coefficient matrix to obtain a verification set first index prediction matrix composed of predicted values of detection indexes of the verification set;

a sixth prediction unit 314, inputting the MIR spectrum matrix of the verification set obtained by the training set dividing unit into the detection model corresponding to the second coefficient matrix to obtain a verification set second index prediction matrix composed of the predicted values of the detection indexes of the verification set;

a seventh prediction unit 315, inputting the NIR spectrum preprocessing matrix of the verification set obtained by the spectrum preprocessing unit into the detection model corresponding to the third coefficient matrix to obtain a verification set third index prediction matrix composed of the predicted values of the detection indexes of the verification set;

an eighth prediction unit 316, inputting the MIR spectrum preprocessing matrix of the verification set obtained by the spectrum preprocessing unit into the detection model corresponding to the fourth coefficient matrix to obtain a verification set fourth index prediction matrix composed of the predicted values of the detection indexes of the verification set;

a first verification unit 317, obtaining a first verification value, a second verification value, a third verification value and a fourth verification value respectively according to verification indexes through the verification set first index prediction matrix obtained by the fifth prediction unit, the verification set second index prediction matrix obtained by the sixth prediction unit, the verification set third index prediction matrix obtained by the seventh prediction unit, the verification set fourth index prediction matrix obtained by the eighth prediction unit and the index matrix obtained by the training set dividing unit, where the verification indexes are used for representing prediction performance of the detection model;

a threshold value range obtaining unit 318, taking an optimal value of the first verification value, the second verification value, the third verification value and the fourth verification value obtained by the first verification unit as an optimal verification value, taking the optimal verification value as a threshold value, and taking a range of the threshold value in a direction of improving the prediction performance of the detection model as a threshold value range;

a fifth training unit 319, performing data-level fusion on the NIR spectrum matrix and the MIR spectrum matrix of the calibration set obtained by the training set dividing unit to form a calibration set first data-level fusion matrix, and inputting the calibration set first data-level fusion matrix and the index matrix of the calibration set into the detection model to train the detection model to obtain a fifth coefficient matrix;

a sixth training unit 320, performing the data-level fusion on the NIR spectrum preprocessing matrix and the MIR spectrum preprocessing matrix of the calibration set obtained by the spectrum preprocessing unit to form a calibration set second data-level fusion matrix, and inputting the calibration set second data-level fusion matrix and the index matrix of the calibration set into the detection model to train the detection model to obtain a sixth coefficient matrix;

a ninth prediction unit 321, taking the calibration set first data-level fusion matrix as the input matrix, inputting a detection model corresponding to the fifth coefficient matrix, and obtaining a calibration set fifth index prediction matrix composed of the predicted values of the detection indexes of the calibration set;

a tenth prediction unit 322, taking the calibration set second data-level fusion matrix as the input matrix, inputting a detection model corresponding to the sixth coefficient matrix, and obtaining a calibration set sixth index prediction matrix composed of the predicted values of the detection indexes of the verification set;

an eleventh prediction unit 323, taking a verification set first data-level fusion matrix formed by data-level fusion of the NIR spectrum matrix and the MIR spectrum matrix of the verification set as the input matrix, and inputting the detection model corresponding to the fifth coefficient matrix to obtain a verification set fifth index prediction matrix composed of the predicted values of the detection indexes of the verification set;

a twelfth prediction unit 324, taking a verification set second data-level fusion matrix formed by data-level fusion of the NIR spectrum preprocessing matrix and the MIR spectrum preprocessing matrix of the verification set as the input matrix, and inputting the detection model corresponding to the sixth coefficient matrix to obtain a verification set sixth index prediction matrix composed of the predicted values of the detection indexes of the verification set;

a second verification unit 325, respectively obtaining a fifth verification value and a sixth verification value according to the verification indexes through the verification set fifth index prediction matrix, the verification set sixth index prediction matrix and the index matrix;

a seventh training unit 326, performing feature-level fusion on the NIR spectrum variable screening matrix and the MIR spectrum variable screening matrix of the calibration set to form a calibration set first feature-level fusion matrix, inputting the calibration set first feature-level fusion matrix and the index matrix of the calibration set into the detection model, and training the detection model to obtain a seventh coefficient matrix;

an eighth training unit 327, performing the feature-level fusion on the preprocessing NIR spectrum variable screening matrix and the preprocessing MIR spectrum variable screening matrix of the calibration set to form a calibration set second feature-level fusion matrix, inputting the calibration set second feature-level fusion matrix and the index matrix of the calibration set into the detection model, and training the detection model to obtain an eighth coefficient matrix;

a thirteenth prediction unit 328, taking the calibration set first feature-level fusion matrix as the input matrix, inputting a detection model corresponding to the seventh coefficient matrix, and obtaining a calibration set seventh index prediction matrix composed of the predicted values of the detection indexes of the calibration set;

a fourteenth prediction unit 329, taking the calibration set second feature-level fusion matrix as the input matrix, inputting a detection model corresponding to the eighth coefficient matrix, and obtaining a calibration set eighth index prediction matrix composed of the predicted values of the detection indexes of the calibration set;

a fifteenth prediction unit 330, taking a verification set first feature-level fusion matrix formed by feature-level fusion of the NIR spectrum variable screening matrix and the MIR spectrum variable screening matrix of the verification set as the input matrix, and inputting the detection model corresponding to the seventh coefficient matrix to obtain a verification set seventh index prediction matrix composed of the predicted values of the detection indexes of the verification set;

a sixteenth prediction unit 331, taking a verification set second feature-level fusion matrix formed by data-level fusion of the preprocessing NIR spectrum variable screening matrix and the preprocessing MIR spectrum variable screening matrix of the verification set as the input matrix, and inputting the detection model corresponding to the eighth coefficient matrix to obtain a verification set eighth index prediction matrix composed of the predicted values of the detection indexes of the verification set;

a third verification unit 332, respectively obtaining a seventh verification value and an eighth verification value according to the verification indexes through the verification set seventh index prediction matrix, the verification set eighth index prediction matrix and the index matrix;

a verification value screening unit 333, screening the first verification value to the eighth verification value according to the threshold value range, and screening out a verification value group within the threshold value range; and a ninth training unit 334, carrying out decision-level fusion on a calibration set index matrix corresponding to the verification value group to obtain a calibration set decision-level fusion matrix, inputting the calibration set decision-level fusion matrix and the calibration set index matrix into the detection model, and training the detection model to obtain a ninth coefficient matrix, where the ninth coefficient matrix is a trained coefficient matrix.

In some embodiments of the disclosure, the detection module 400 includes:

a data-level fusion unit 403, performing the data-level fusion on the NIR spectrum matrix and the MIR spectrum matrix of the substance to be detected to obtain a spectral fusion matrix; and a prediction unit 406, inputting a spectral fusion matrix obtained by the data-level fusion unit as the input matrix into a trained detection model to obtain a first index matrix as the output matrix; and taking the first index matrix as a detection result of detection indexes of the substance to be detected; and where the index matrix is a matrix composed of index values of detection indexes determined by a standard method; the first index matrix is a matrix composed of index values of detection indexes predicted by the detection model; and the detection indexes include one or more of a flash point, a pour point, density and kinematic viscosity.

In some embodiments of the present disclosure, the detection module further includes:

a decision-level fusion unit 405, inputting the NIR spectrum matrix of the substance to be detected as the input matrix into the trained detection model to obtain a second index matrix as the output matrix; inputting the MIR spectrum matrix of the substance to be detected as the input matrix into the trained detection model to obtain a third index matrix as the output matrix; and performing the decision-level fusion on the first index matrix, the second index matrix and the third index matrix to obtain a fourth index matrix;

where the prediction unit inputs the fourth index matrix of the decision-level fusion unit as the input matrix into the trained detection model to obtain a fifth index matrix as the output matrix; and taking the fifth index matrix as the detection result of the detection indexes of the substance to be detected; and where the second index matrix, the third index matrix and the fifth index matrix are matrices composed of the index values of the detection indexes predicted by the detection model.

In some embodiments of the disclosure, the prediction module further includes:

the spectrum preprocessing unit 401: performing the spectrum preprocessing on spectral data of the NIR spectrum of the substance to be detected to form a first spectrum matrix;

performing the spectrum preprocessing on spectral data of the MIR spectrum of the substance to be detected to form a second spectrum matrix; and where the spectrum preprocessing includes the derivative processing or/and the VN processing, and the derivative processing includes the first-order derivative processing or/and the higher-order derivative processing.

Among them, the data-level fusion unit 403 performs data-level fusion on the first spectrum matrix and the second spectrum matrix to form a first fusion matrix.

The decision-level fusion unit 405 inputs the first spectrum matrix as the input matrix into the trained detection model to obtain a sixth index matrix as the output matrix; inputs the second spectrum matrix as the input matrix into the trained detection model to obtain a seventh index matrix as the output matrix; inputs the first fusion matrix as the input matrix into the trained detection model to obtain an eighth index matrix as the output matrix; and performs the decision-level fusion on the sixth index matrix, the seventh index matrix, and the eighth index matrix to obtain a fourth index matrix.

In some embodiments of the present disclosure, the prediction module further includes:

spectrum variable screening unit 402: performing the spectrum variable screening processing on the NIR spectrum and the MIR spectrum of the substance to be detected respectively to form a third spectrum matrix and a fourth spectrum matrix; and where the spectrum variable screening processing includes the VIP processing.

Among them, the prediction module further includes a feature-level fusion unit 404, which performs feature-level fusion on the third spectrum matrix and the fourth spectrum matrix to form a second fusion matrix.

The decision-level fusion unit 405 inputs the third spectrum matrix as the input matrix into the trained detection model to obtain a ninth index matrix as the output matrix; inputs the fourth spectrum matrix as the input matrix into the trained detection model to obtain a tenth index matrix as the output matrix; inputs the second fusion matrix as the input matrix into the trained detection model to obtain an eleventh index matrix as the output matrix; and performs the decision-level fusion on the ninth index matrix, the tenth index matrix and the eleventh index matrix to obtain a fourth index matrix.

In one embodiment of the present disclosure, the prediction module includes a spectrum preprocessing unit 401, a spectrum variable screening unit 402, a data-level fusion unit 403, a feature-level fusion unit 404, a decision-level fusion unit 405 and a prediction unit 406. Optionally, the spectrum variable screening unit 402 performs spectrum variable screening on the NIR spectrum and the MIR spectrum after spectrum preprocessing by the spectrum preprocessing unit 401.

Figure 4:
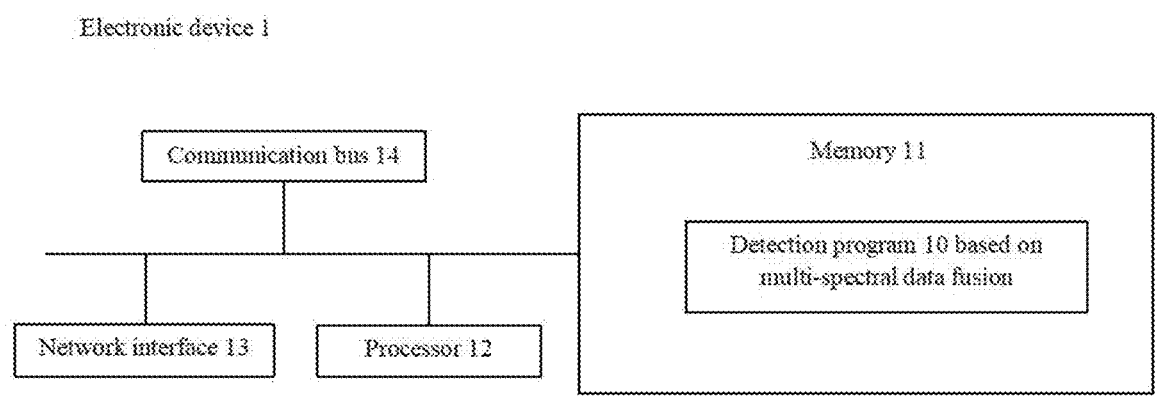
FIG. 4 is a schematic block diagram of an embodiment of the electronic device according to the present disclosure.

The above detection methods based on the multi-spectral data fusion may be applied to the electronic device 1. Referring to FIG. 4, it is a schematic diagram of the application environment of the preferred embodiment of the detection method based on multi-spectral data fusion of the present disclosure.

In this embodiment, the electronic device 1 may be a server, a smart phone, a tablet computer, a portable computer, a desktop computer and other terminal devices with computing functions.

The electronic device 1 includes a processor 12 and a memory 11, and may also include a network interface 13, a communication bus 14, and the like.

The memory 11 includes at least one type of readable storage medium. The at least one type of readable storage medium may be a nonvolatile storage medium such as a flash memory, a hard disk, a multimedia card, a card-type memory, and the like. In some embodiments, the readable storage medium may be an internal storage unit of the electronic device 1, such as a hard disk of the electronic device 1. In other embodiments, the readable storage medium may also be an external memory of the electronic device 1, such as a plug-in hard disk, Smart Media Card (SMC), Secure Digital (SD) card, Flash Card, etc. provided on the electronic device 1.

In this embodiment, the readable storage medium of the memory 11 is generally used to store the detection program 10 installed in the electronic device 1 based on multi-spectral data fusion, representative samples and data levels of representative samples. The memory 11 may also be used to temporarily store data that has been or will be output.

In some embodiments, the processor 12 may be a Central Processing Unit (CPU), a microprocessor or other data processing chips, and is used for running program codes stored in the memory 11 or processing data, such as executing the detection program 10 based on multi-spectral data fusion.

The network interface 13 may optionally include a standard wired interface and a wireless interface (such as a WI-FI interface), which is usually used to establish communication connection between the electronic device 1 and other electronic devices.

The communication bus 14 is used to realize connection communication between these components.

FIG. 4 only shows the electronic device 1 with the components 11-14, but it should be understood that not all the components shown are required to be implemented, and more or less components may be implemented instead.

Optionally, the electronic device 1 may further include a user interface, which may include an input unit such as a Keyboard, a voice input device such as a microphone and other devices with voice recognition function, a voice output device such as a stereo, headphones, etc. Optionally, the user interface may also include a standard wired interface and a wireless interface.

Optionally, the electronic device 1 may further include a display, which may also be called a display screen or a display unit. In some embodiments, it may be an LED display, a liquid crystal display, a touch-sensitive liquid crystal display and an Organic Light-Emitting Diode (OLED) touch device. The display is used to display information processed in the electronic device 1 and to display a visual user interface.

Optionally, the electronic device 1 further includes a touch sensor. The area provided by the touch sensor for the user to touch is called the touch area. In addition, the touch sensor described here may be a resistive touch sensor, a capacitive touch sensor and the like. Moreover, the touch sensor includes not only a contact touch sensor, but also a proximity touch sensor. In addition, the touch sensor may be a single sensor or multiple sensors arranged in an array, for example.

In addition, the area of the display of the electronic device 1 may be the same as or different from that of the touch sensor. Optionally, a display and the touch sensor are stacked to form a touch display screen. The device detects the touch operation triggered by the user based on the touch display screen.

Optionally, the electronic device 1 may further include a Radio Frequency (RF) circuit, a sensor, an audio circuit, etc., which will not be described in detail here.

In addition, the embodiment of the disclosure also provides a computer-readable storage medium, which includes a detection program based on multi-spectral data fusion, and when the detection program based on multi-spectral data fusion is executed by a processor, the steps of the detection method based on multi-spectral data fusion of the above embodiments are realized.

The specific embodiment of the computer-readable storage medium of the present disclosure is basically the same as the specific embodiment of the detection method and electronic device based on multi-spectral data fusion described above, and will not be repeated here.

In order to verify the beneficial effects of the present disclosure, the following specific embodiments are carried out.

The detection method based on multi-spectral data fusion in this embodiment includes the following steps.

Step 1: 138 groups of diesel oil samples are collected as training samples in an oil depot in Beijing, including 67 groups of 0 #diesel oil, 30 groups of −10 #diesel oil, 16 groups of −20 #diesel oil and 25 groups of −35 #diesel oil. Its wide sources and different processing techniques ensure the difference of diesel samples. By randomly dividing 138 groups of diesel oil samples, 103 groups of diesel oil samples are divided into calibration sets for establishing a partial least squares (PLS) detection model, and the other 35 groups of diesel oil samples are divided into verification sets for verifying the detection model.

Step 2: the flash points of diesel oil samples are determined by standard method to obtain the flash point measured values of 138 training samples, and a calibration set index matrix $YZ_C$ and a verification set index matrix $YZ_V$ are formed.

Figure 5A:
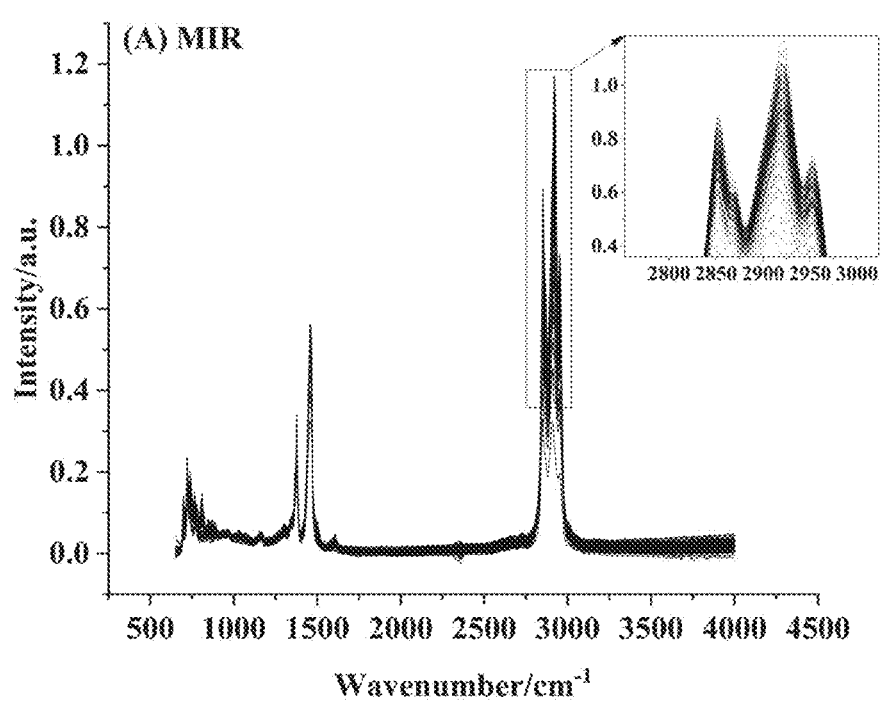
FIG. 5A is a MIR spectrogram of a diesel oil training sample according to a specific embodiment of the detection method based on multi-spectral data fusion of the present disclosure.
Figure 5B:
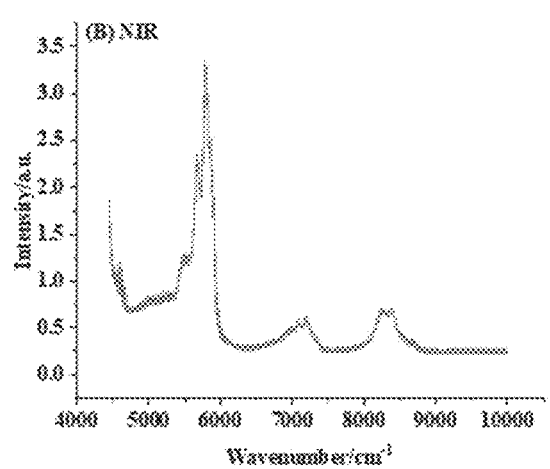
FIG. 5B is a NIR spectrogram of a diesel oil training sample according to a specific embodiment of the detection method based on multi-spectral data fusion of the present disclosure.
Figure 6A:
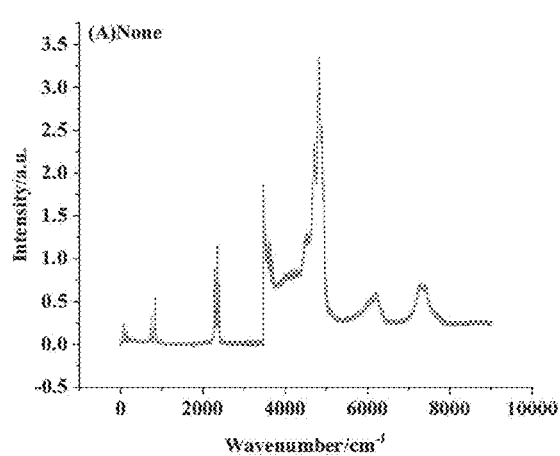
FIG. 6A is a data-level fusion spectrogram using spectrum preprocessing method non-preprocessing (None) according to a specific embodiment of the detection method based on multi-spectral data fusion of the present disclosure.
Figure 6B:
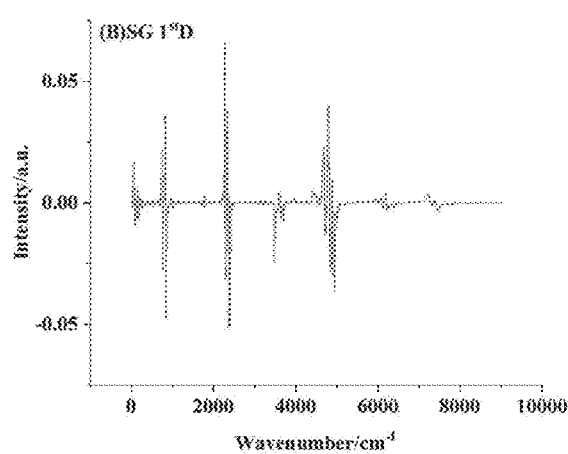
FIG. 6B is a data-level fusion spectrogram using spectrum preprocessing method SG first-order derivative (SG $1^{st}$D) according to a specific embodiment of the detection method based on multi-spectral data fusion of the present disclosure.
Figure 6C:
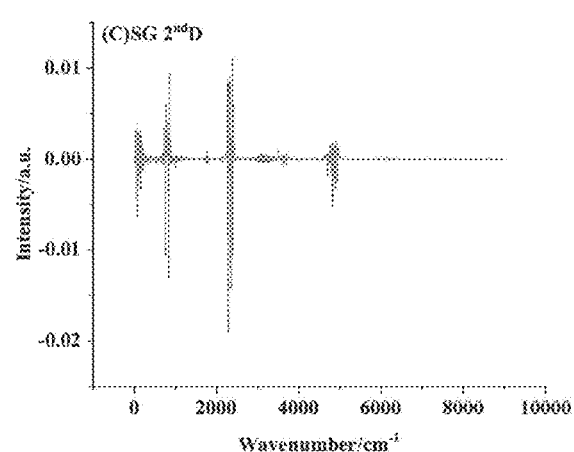
FIG. 6C is a data-level fusion spectrogram using spectrum preprocessing method SG second-order derivative (SG $2^{nd}$D) according to a specific embodiment of the detection method based on multi-spectral data fusion of the present disclosure.
Figure 6D:
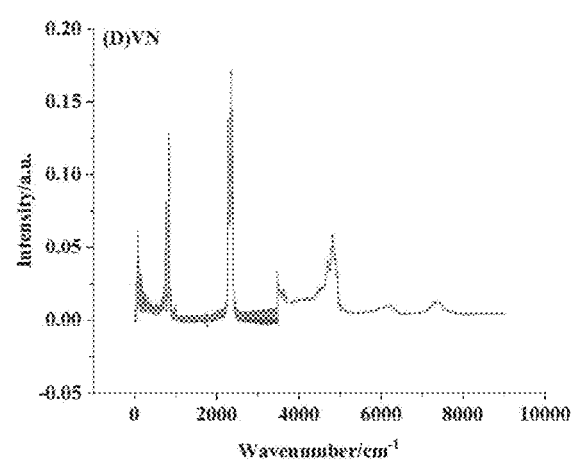
FIG. 6D is a data-level fusion spectrogram using spectrum preprocessing method VN according to a specific embodiment of the detection method based on multi-spectral data fusion of the present disclosure.

Step 3: Fourier transform NIR and MIR spectrometers are used to collect the spectrograms of diesel oil samples, and the spectrograms are shown in FIG. 5A and FIG. 5B. At the same time, the NIR spectrum matrix $N_C$ and MIR spectrum matrix $M_C$ of diesel oil calibration set, and the NIR spectrum matrix $N_V$ and MIR spectrum matrix $M_V$ of verification set are obtained.

Step 4: the spectrum is preprocessed, and the preprocessing methods include SG $1^{st}D$, SG $2^{nd}D$ and VN.

Step 5: Under the preprocessing conditions of None, SG $1^{st}D$, SG $2^{nd}D$ and VN, a single spectrum PLS detection model is established through calibration set samples. After the PLS detection model is established, external verification is carried out by using verification set samples. The results are shown in Table 1.

TABLE 1

| Spectrum | Spectrum preprocessing | Verification set | |
|---|---|---|---|
| | | RMSEP | $R_P^2$ |
| NIR | None | 3.06 | 0.83 |
| | SG $1^{st}D$ | 3.25 | 0.81 |
| | SG $2^{nd}D$ | 5.30 | 0.54 |
| | VN | 3.11 | 0.83 |
| MIR | None | 2.51 | 0.89 |
| | SG $1^{st}D$ | 2.55 | 0.89 |
| | SG $2^{nd}D$ | 2.74 | 0.86 |
| | VN | 2.45 | 0.90 |

In Table 1, the best prediction performance is the MIR-PLS model (VN-MIR-PLS) established after VN preprocessing. The RMSEP value of the samples in the prediction verification set is the smallest and the $R_P^2$ value is the largest, which are 2.45 and 0.90 respectively. Therefore, the RMSEP value of VN-MIR-PLS model is selected as the threshold value to screen other models, so as to construct an optimized decision-level fusion model.

Step 6: under the above four preprocessing conditions, a data-level fusion (Low) model is established by splicing NIR and MIR, and the spectrograms are shown in FIG. 6A, FIG. 6B, FIG. 6C and FIG. 6D. The specific steps are as follows.

The NIR and MIR after the same preprocessing are fused. For example, the NIR and MIR matrices after SG $1^{st}$D preprocessing in step 4 (which may be replaced by None, SG $2^{nd}$D and VN preprocessing conditions here) are $N_{SG\ 1stD}$ and $M_{SG\ 1stD}$ respectively. Then the data-level fusion matrix $L_{SG\ 1stD}$ under the preprocessing condition of SG $1^{st}$D is:

$$L_{SG1stD}=[N_{SG1stD},M_{SG1stD}].$$

A data-level fusion model is established, and the data-level fusion matrix $L_{SG\ 1stD}$ is input into the data-level fusion model, so that the prediction result matrix $Y_{SG\ 1stD-L-pred}$ of the data-level fusion model under the preprocessing condition of SG $1^{st}$D may be obtained, and the RMSEP and $R_P^2$ of the data-level fusion model to the verification set samples under different preprocessing conditions may be calculated at the same time.

The prediction results of the data-level fusion model verification set samples are shown in Table 2.

TABLE 2

| Spectrum | Spectrum preprocessing | Verification set | |
|---|---|---|---|
| | | RMSEP | $R_P^2$ |
| Low | None | 2.47 | 0.89 |
| | SG $1^{st}$D | 3.21 | 0.82 |
| | SG $2^{nd}$D | 2.31 | 0.91 |
| | VN | 2.40 | 0.90 |

In Table 2, the RMSEP value of VN-MIR-PLS model is taken as the threshold value. The models below or equal to this threshold value are Low-PLS model (SG $2^{nd}$D-Low-PLS) established after SG $2^{nd}$D preprocessing and Low-PLS model (VN-Low-PLS) established after VN preprocessing, with RMSEP values of 2.31 and 2.40 respectively.

Step 7: under the above four preprocessing conditions, the NIR and MIR data are screened for feature variables, including CARS and VIP, and the NIR and MIR feature variables screened by CARS and VIP are fused. For example, the NIR and MIR matrices preprocessed by SG $1^{st}$D in step 4 (here may be replaced by preprocessing conditions of None, SG $2^{nd}$D and VN) are screened feature variables by CARS (here may be replaced by VIP) to get $C_{NIR}$ and $C_{MIR}$. Then the feature-level fusion matrix $M_{CARS}$ screened by CARS is $$M_{CARS}=[C_{NIR},C_{MIR}]$$

At the same time, a feature-level fusion model is established, and the feature-level fusion matrix $M_{CARS}$ is input into the feature-level fusion model, so that the prediction result matrix $Y_{SG\ 1stD-CARS-pred}$ of the CARS feature-level fusion model under SG $1^{st}$D preprocessing conditions may be obtained, and the RMSEP and $R_P^2$ of the feature-level fusion model to the verification set samples under different preprocessing conditions may be calculated.

The prediction results of the feature-level fusion model established by CARS and VIP on the verification set samples are shown in Table 3.

TABLE 3

| Spectrum | Spectrum preprocessing | Verification set | |
|---|---|---|---|
| | | RMSEP | $R_P^2$ |
| CARS | None | 2.28 | 0.91 |
| | SG $1^{st}$D | 1.86 | 0.94 |
| | SG $2^{nd}$D | 3.08 | 0.84 |
| | VN | 2.03 | 0.93 |
| VIP | None | 3.11 | 0.83 |
| | SG $1^{st}$D | 2.99 | 0.85 |
| | SG $2^{nd}$D | 2.38 | 0.90 |
| | VN | 3.01 | 0.84 |

In Table 3, the models with RMSEP value within the threshold value of 2.45 include CARS feature-level fusion model without spectrum preprocessing (None-CARS-PLS), CARS feature-level fusion model with SG $1^{st}$D preprocessing (SG $1^{st}$D-CARS-PLS), the CARS feature-level fusion model VN-CARS-PLS with VN preprocessing and the VIP feature-level fusion model with SG $2^{nd}$D preprocessing (SG $2^{nd}$D-VIP-PLS). RMSEP values are 2.28, 1.86, 2.03 and 2.38, respectively.

COMPARATIVE EMBODIMENT

Step 8: the prediction results of all single spectrum models, data-level fusion models and feature-level fusion models obtained in steps 5, 6 and 7 are fused to establish an unoptimized decision-level fusion (High) PLS model, and the specific steps are as follows.

The prediction results of all single spectrum models, data-level fusion models and feature-level fusion models obtained in steps 5, 6 and 7 are fused, that is, $Y_{NONE-N-pred}$, $Y_{SG\ 1stD-N-pred}$, $Y_{SG\ 2ndD-N-pred}$, ... are fused to obtain an unoptimized decision-level fusion matrix H:

$$H=[Y_{NONE-N-pred},Y_{SG1stD-N-pred},Y_{SG2ndD-N-pred},\ldots].$$

At the same time, the decision-level fusion matrix is established, and the unoptimized decision-level fusion matrix H is input into the decision-level fusion matrix, so that the prediction result of the unoptimized decision-level fusion model may be obtained, and the RMSEP and $R_P^2$ of the model to the verification set samples are calculated.

Embodiment

Step 8': the prediction results of seven models VN-MIR-PLS, SG $2^{nd}$D-Low-PLS, VN-Low-PLS, None-CARS-PLS, SG $1^{st}$D-CARS-PLS, VN-CARS-PLS and SG $2^{nd}$D-VIP-PLS screened out in steps 5, 6 and 7 are combined to establish an optimized decision-level fusion (Opt-High) model. The fusion process repeats step 8, and all the prediction results of single spectrum model, data-level fusion model and feature-level fusion model in step 8 are replaced by the prediction results of the above models. The prediction results of High-PLS (comparative embodiment) and Opt-High-PLS model (the present disclosure) on the calibration set and verification set are shown in Table 4.

TABLE 4

| Spectrum | Verification set | |
|---|---|---|
| | RMSEP | $R_P^2$ |
| Comparative embodiment | 2.57 | 0.89 |
| The present disclosure | 1.59 | 0.96 |

As may be seen from Table 4, compared with the VN-MIR-PLS model, the RMSEP value of the High-PLS model based on the comparative embodiment fusion of all model measurement results is larger. This is because different spectrum preprocessing methods and feature variable screening methods will cause the prediction error of the model to increase, and the High-PLS model will amplify this prediction error, which will lead to the decline of the prediction performance of the model. On the contrary, in the embodiment of this disclosure, the single spectrum model with the best prediction performance is taken as the control group, and the Opt-High-PLS model established based on the prediction results of the optimized model may effectively improve the prediction performance of the model, and the RMSEP value is 1.59. Compared with VN-MIR-PLS model and High-PLS model, RMSEP value decreases by 35% and 38% respectively, and $R_P^2$ increases from 0.90 and 0.89 to 0.96.

Compared with a single spectrum model, the prediction error of the model established by adopting the optimized decision-level fusion method is reduced by 35%. Compared with the model established by the non-optimized decision-level data fusion method, the prediction error is reduced by 38%, which proves that the optimized decision-level data fusion method may effectively improve the prediction performance of the model.

The detection method based on multi-spectral data fusion is a decision-level data fusion method based on NIR and MIR spectra, which may accurately predict the flash point of diesel oil when used for diesel oil flash point detection.

The disclosure is used to determine the flash point of diesel oil by data fusion of NIR and MIR spectra and establishing a PLS model. Under various spectrum preprocessing conditions, a single spectrum model, a data-level fusion model and a feature-level fusion model are established through NIR and MIR spectra. Taking the prediction error of the single spectrum model with the best prediction performance as the threshold value, the selected models are combined to establish an optimized decision-level fusion model. Compared with the single spectrum model and the unoptimized decision-level fusion model, the optimized decision-level data fusion method may effectively reduce the prediction error of the model for unknown samples and improve the prediction performance.

It should be noted that in this disclosure, the terms "including", "comprising" or any other variation thereof are intended to cover non-exclusive inclusion, so that a process, device, article or method including a series of elements includes not only those elements, but also other elements not explicitly listed, or elements inherent to such process, device, article or method. Without further restrictions, an element defined by the phrase "including one . . . " does not exclude the existence of other identical elements in the process, device, article or method including the element.

The serial numbers of the above embodiments of the present disclosure are only for description and do not represent the advantages and disadvantages of the embodiments. Through the description of the above embodiments, those skilled in the art may clearly understand that the methods of the above embodiments may be realized by means of software and necessary general hardware platform, and of course they may also be realized by hardware, but in many cases, the former is the better embodiment. Based on this understanding, the technical scheme of the present disclosure may be embodied in the form of software products in essence or in the part that contributes to the prior art. The computer software product is stored in a storage medium (such as ROM/RAM, magnetic disk and optical disk) as mentioned above, and includes several instructions to make a terminal device (which may be a mobile phone, a computer, a server, or a network device, etc.) execute the methods described in various embodiments of the present disclosure.

The above are only the preferred embodiments of the present disclosure, which do not limit the patent scope of the present disclosure. Any equivalent structure or equivalent flow transformation made by using the contents of the specification and drawings of the present disclosure, or directly or indirectly applied to other related technical fields, are equally included in the patent protection scope of the present disclosure.

What is claimed is:

1. A detection method based on multi-spectral data fusion, comprising:
    collecting spectrum: collecting near infrared spectrum and mid infrared spectrum of a substance to be detected to obtain a near infrared spectrum matrix and a mid infrared spectrum matrix of the substance to be detected;
    constructing a detection model: constructing the detection model by a following formula, $$Y = XP^T BQ$$

wherein X is an input matrix, Y is an output matrix, B is a coefficient matrix, and P and Q are load matrices of X and Y respectively; and T is a score matrix of an independent variable X;
    training the detection model; and
    predicting detection indexes;
    wherein steps of training the detection model comprise:
    collecting training samples to construct training sets, wherein the training sets comprise near infrared spectra and mid infrared spectra of a plurality of the training samples and index values of detection indexes of the plurality of the training samples;
    dividing the training sets into a calibration set and a verification set to obtain a near infrared spectrum matrix, a mid infrared spectrum matrix and an index matrix of the calibration set and a near infrared spectrum matrix, a mid infrared spectrum matrix and an index matrix of the verification set;
    performing spectrum preprocessing on near infrared spectra and mid infrared spectra of the calibration set and the verification set respectively to obtain a near infrared spectrum preprocessing matrix and a mid infrared spectrum preprocessing matrix of the calibration set, and a near infrared spectrum preprocessing matrix and a mid infrared spectrum preprocessing matrix of the verification set, wherein the spectrum preprocessing comprises derivative processing or/and vector normalization processing, and the derivative processing comprises first-order derivative processing or/and higher-order derivative processing;
    performing spectrum variable screening processing on the near infrared spectra, the mid infrared spectra, near infrared spectra after the spectrum preprocessing and mid infrared spectra after the spectrum preprocessing of the calibration set and the verification set respectively to obtain a near infrared spectrum variable screening matrix, a mid infrared spectrum variable screening matrix, a preprocessing near infrared spectrum variable screening matrix and a preprocessing mid infrared spectrum variable screening matrix of the calibration set, and a near infrared spectrum variable screening matrix, a mid infrared spectrum variable screening matrix, a preprocessing near infrared spectrum variable screening matrix and a preprocessing mid infrared spectrum variable screening matrix of the verification set, wherein the spectrum variable screening processing comprises competitive adaptive reweighted sampling processing or/and variable importance projection processing;

inputting the near infrared spectrum matrix and the index matrix of the calibration set into the detection model, and training the detection model to obtain a first coefficient matrix;

inputting the mid infrared spectrum matrix and the index matrix of the calibration set into the detection model, and training the detection model to obtain a second coefficient matrix;

inputting the near infrared spectrum preprocessing matrix and the index matrix of the calibration set into the detection model, and training the detection model to obtain a third coefficient matrix;

inputting the mid infrared spectrum preprocessing matrix and the index matrix of the calibration set into the detection model, and training the detection model to obtain a fourth coefficient matrix;

inputting the near infrared spectrum matrix of the calibration set into the detection model corresponding to the first coefficient matrix to obtain a calibration set first index prediction matrix composed of predicted values of detection indexes of the calibration set;

inputting the mid infrared spectrum matrix of the calibration set into the detection model corresponding to the second coefficient matrix to obtain a calibration set second index prediction matrix composed of the predicted values of the detection indexes of the calibration set;

inputting the near infrared spectrum preprocessing matrix of the calibration set into the detection model corresponding to the third coefficient matrix to obtain a calibration set third index prediction matrix composed of the predicted values of the detection indexes of the calibration set;

inputting the mid infrared spectrum preprocessing matrix of the calibration set into the detection model corresponding to the fourth coefficient matrix to obtain a calibration set fourth index prediction matrix composed of the predicted values of the detection indexes of the calibration set;

inputting the near infrared spectrum matrix of the verification set into the detection model corresponding to the first coefficient matrix to obtain a verification set first index prediction matrix composed of predicted values of detection indexes of the verification set;

inputting the mid infrared spectrum matrix of the verification set into the detection model corresponding to the second coefficient matrix to obtain a verification set second index prediction matrix composed of the predicted values of the detection indexes of the verification set;

inputting the near infrared spectrum preprocessing matrix of the verification set into the detection model corresponding to the third coefficient matrix to obtain a verification set third index prediction matrix composed of the predicted values of the detection indexes of the verification set;

inputting the mid infrared spectrum preprocessing matrix of the verification set into the detection model corresponding to the fourth coefficient matrix to obtain a verification set fourth index prediction matrix composed of the predicted values of the detection indexes of the verification set;

obtaining a first verification value, a second verification value, a third verification value and a fourth verification value respectively according to verification indexes through the verification set first index prediction matrix, the verification set second index prediction matrix, the verification set third index prediction matrix, the verification set fourth index prediction matrix and the index matrix, wherein the verification indexes are used for representing prediction performance of the detection model;

taking an optimal value of the first verification value, the second verification value, the third verification value and the fourth verification value as an optimal verification value, taking the optimal verification value as a threshold value, and taking a range of the threshold value in a direction of improving the prediction performance of the detection model as a threshold value range;

performing data-level fusion on the near infrared spectrum matrix and the mid infrared spectrum matrix of the calibration set to form a calibration set first data-level fusion matrix, and inputting the calibration set first data-level fusion matrix and the index matrix of the calibration set into the detection model to train the detection model to obtain a fifth coefficient matrix;

performing the data-level fusion on the near infrared spectrum preprocessing matrix and the mid infrared spectrum preprocessing matrix of the calibration set to form a calibration set second data-level fusion matrix, and inputting the calibration set second data-level fusion matrix and the index matrix of the calibration set into the detection model to train the detection model to obtain a sixth coefficient matrix;

taking the calibration set first data-level fusion matrix as the input matrix, inputting the detection model corresponding to the fifth coefficient matrix, and obtaining a calibration set fifth index prediction matrix composed of the predicted values of the detection indexes of the calibration set;

taking the calibration set second data-level fusion matrix as the input matrix, inputting the detection model corresponding to the sixth coefficient matrix, and obtaining a calibration set sixth index prediction matrix composed of the predicted values of the detection indexes of the verification set;

taking a verification set first data-level fusion matrix formed by data-level fusion of the near infrared spectrum matrix and the mid infrared spectrum matrix of the verification set as the input matrix, and inputting the detection model corresponding to the fifth coefficient matrix to obtain a verification set fifth index prediction matrix composed of the predicted values of the detection indexes of the verification set;

taking a verification set second data-level fusion matrix formed by data-level fusion of the near infrared spectrum preprocessing matrix and the mid infrared spectrum preprocessing matrix of the verification set as the input matrix, and inputting the detection model corresponding to the sixth coefficient matrix to obtain a verification set sixth index prediction matrix composed of the predicted values of the detection indexes of the verification set;

respectively obtaining a fifth verification value and a sixth verification value according to the verification indexes through the verification set fifth index prediction matrix, the verification set sixth index prediction matrix and the index matrix;

performing feature-level fusion on the near infrared spectrum variable screening matrix and the mid infrared spectrum variable screening matrix of the calibration set to form a calibration set first feature-level fusion matrix, inputting the calibration set first feature-level fusion matrix and the index matrix of the calibration set into the detection model, and training the detection model to obtain a seventh coefficient matrix;

performing the feature-level fusion on the preprocessing near infrared spectrum variable screening matrix and the preprocessing mid infrared spectrum variable screening matrix of the calibration set to form a calibration set second feature-level fusion matrix, inputting the calibration set second feature-level fusion matrix and the index matrix of the calibration set into the detection model, and training the detection model to obtain an eighth coefficient matrix;

taking the calibration set first feature-level fusion matrix as the input matrix, inputting the detection model corresponding to the seventh coefficient matrix, and obtaining a calibration set seventh index prediction matrix composed of the predicted values of the detection indexes of the calibration set;

taking the calibration set second feature-level fusion matrix as the input matrix, inputting the detection model corresponding to the eighth coefficient matrix, and obtaining a calibration set eighth index prediction matrix composed of the predicted values of the detection indexes of the calibration set;

taking a verification set first feature-level fusion matrix formed by feature-level fusion of the near infrared spectrum variable screening matrix and the mid infrared spectrum variable screening matrix of the verification set as the input matrix, and inputting the detection model corresponding to the seventh coefficient matrix to obtain a verification set seventh index prediction matrix composed of the predicted values of the detection indexes of the verification set;

taking a verification set second feature-level fusion matrix formed by data-level fusion of the preprocessing near infrared spectrum variable screening matrix and the preprocessing mid infrared spectrum variable screening matrix of the verification set as the input matrix, and inputting the detection model corresponding to the eighth coefficient matrix to obtain a verification set eighth index prediction matrix composed of the predicted values of the detection indexes of the verification set;

respectively obtaining a seventh verification value and an eighth verification value according to the verification indexes through the verification set seventh index prediction matrix, the verification set eighth index prediction matrix and the index matrix;

screening the first verification value to the eighth verification value according to the threshold value range, and screening out a verification value group within the threshold value range; and carrying out decision-level fusion on a calibration set index matrix corresponding to the verification value group to obtain a calibration set decision-level fusion matrix, inputting the calibration set decision-level fusion matrix and the calibration set index matrix into the detection model, and training the detection model to obtain a ninth coefficient matrix, wherein the ninth coefficient matrix is a trained coefficient matrix;

wherein steps of predicting the detection indexes comprise:

performing the data-level fusion on the near infrared spectrum matrix and the mid infrared spectrum matrix of the substance to be detected to obtain a spectral fusion matrix; and inputting the spectral fusion matrix of the substance to be detected as the input matrix into a trained detection model to obtain a first index matrix as the output matrix; and taking the first index matrix as a detection result of the detection indexes of the substance to be detected; and wherein the index matrix is a matrix composed of index values of detection indexes determined by measurements; the first index matrix is a matrix composed of index values of detection indexes predicted by the detection model; and the detection indexes comprise one or more of a flash point, a pour point, density and kinematic viscosity.

2. The detection method based on the multi-spectral data fusion according to claim 1, wherein the verification indexes comprise a determination coefficient or/and a predicted root mean square error;

or/and wherein the optimal verification value is a minimum value of the predicted root mean square error or/and a maximum value of the determination coefficient; and the threshold value range is not greater than the minimum value of the predicted root mean square error or/and not less than the maximum value of the determination coefficient;

or/and the steps of predicting the detection indexes further comprise:

inputting the near infrared spectrum matrix of the substance to be detected as the input matrix into the trained detection model to obtain a second index matrix as the output matrix;

inputting the mid infrared spectrum matrix of the substance to be detected as the input matrix into the trained detection model to obtain a third index matrix as the output matrix;

performing the decision-level fusion on the first index matrix, the second index matrix and the third index matrix to obtain a fourth index matrix; and inputting the fourth index matrix as the input matrix into the trained detection model to obtain a fifth index matrix as the output matrix; and taking the fifth index matrix as the detection result of the detection indexes of the substance to be detected;

wherein the second index matrix, the third index matrix and the fifth index matrix are matrices composed of the index values of the detection indexes predicted by the detection model;

or/and before the steps of predicting the detection indexes, further comprising:

the spectrum preprocessing: performing the spectrum preprocessing on spectral data of the near infrared spectrum of the substance to be detected to form a first spectrum matrix; performing the spectrum preprocessing on spectral data of the mid infrared spectrum of the substance to be detected to form a second spectrum matrix; and wherein the spectrum preprocessing comprises the derivative processing or/and the vector normalization processing, and the derivative processing comprises the first-order derivative processing or/and the higher-order derivative processing;

the steps of predicting the detection indexes further comprise:
  performing the data-level fusion on the first spectrum matrix and the second spectrum matrix to form a first fusion matrix;
  inputting the first spectrum matrix as the input matrix into the trained detection model to obtain a sixth index matrix as the output matrix;
  inputting the second spectrum matrix as the input matrix into the trained detection model to obtain a seventh index matrix as the output matrix;
  inputting the first fusion matrix as the input matrix into the trained detection model to obtain an eighth index matrix as the output matrix; and
  performing the decision-level fusion on the sixth index matrix, the seventh index matrix and the eighth index matrix to obtain the fourth index matrix.

3. The detection method based on the multi-spectral data fusion according to claim 1, wherein before the steps of predicting the detection indexes, further comprising:
  spectrum variable screening: performing the spectrum variable screening processing on the near infrared spectrum and the mid infrared spectrum of the substance to be detected respectively to form a third spectrum matrix and a fourth spectrum matrix; and wherein the spectrum variable screening processing comprises the variable importance projection processing;
  the steps of predicting the detection indexes further comprise:
  performing the feature-level fusion on the third spectrum matrix and the fourth spectrum matrix to form a second fusion matrix;
  inputting the third spectrum matrix as the input matrix into the trained detection model to obtain a ninth index matrix as the output matrix;
  inputting the fourth spectrum matrix as the input matrix into the trained detection model to obtain a tenth index matrix as the output matrix;
  inputting the second fusion matrix as the input matrix into the trained detection model to obtain an eleventh index matrix as the output matrix; and
  performing the decision-level fusion on the ninth index matrix, the tenth index matrix and the eleventh index matrix to obtain a fourth index matrix.

4. The detection method based on the multi-spectral data fusion according to claim 1, wherein before the steps of predicting the detection indexes, further comprising:
  the spectrum preprocessing: performing the spectrum preprocessing on spectral data of the near infrared spectrum of the substance to be detected to form a first spectrum matrix; performing the spectrum preprocessing on spectral data of the mid infrared spectrum of the substance to be detected to form a second spectrum matrix; and wherein the spectrum preprocessing comprises the derivative processing or/and the vector normalization processing, and the derivative processing comprises the first-order derivative processing or/and the higher-order derivative processing; and
  spectrum variable screening: performing the spectrum variable screening processing on the first spectrum matrix and the second spectrum matrix of the substance to be detected respectively to form a fifth spectrum matrix and a sixth spectrum matrix; and wherein the spectrum variable screening processing comprises the variable importance projection processing.

5. The detection method based on the multi-spectral data fusion according to claim 4, wherein the steps of predicting the detection indexes further comprises:
  performing the data-level fusion on the first spectrum matrix and the second spectrum matrix to form a first fusion matrix;
  performing the feature-level fusion on the fifth spectrum matrix and the sixth spectrum matrix to form a third fusion matrix;
  inputting the first spectrum matrix as the input matrix into the trained detection model to obtain a sixth index matrix as the output matrix;
  inputting the second spectrum matrix as the input matrix into the trained detection model to obtain a seventh index matrix as the output matrix;
  inputting the first fusion matrix as the input matrix into the trained detection model to obtain an eighth index matrix as the output matrix;
  inputting the third fusion matrix as the input matrix into the trained detection model to obtain a twelfth index matrix as the output matrix; and
  performing the decision-level fusion on the sixth index matrix, the seventh index matrix, the eighth index matrix, and the twelfth index matrix to obtain a fourth index matrix.

6. The detection method based on the multi-spectral data fusion according to claim 1, wherein the steps of training the detection model comprise:
  collecting the training samples to construct the training sets, wherein the training sets comprise the near infrared spectra and the mid infrared spectra of the plurality of the training samples and the index values of the detection indexes of the plurality of the training samples;
  dividing the training sets into the calibration set and the verification set to obtain the near infrared spectrum matrix, the mid infrared spectrum matrix and the index matrix of the calibration set and the near infrared spectrum matrix, the mid infrared spectrum matrix and the index matrix of the verification set;
  performing the spectrum preprocessing on the near infrared spectra and the mid infrared spectra of the calibration set and the verification set respectively to obtain the near infrared spectrum preprocessing matrix and the mid infrared spectrum preprocessing matrix of the calibration set, and the near infrared spectrum preprocessing matrix and the mid infrared spectrum preprocessing matrix of the verification set, wherein the spectrum preprocessing comprises the derivative processing or/and the vector normalization processing, and the derivative processing comprises the first-order derivative processing or/and the higher-order derivative processing;
  performing the spectrum variable screening processing on the near infrared spectra after the spectrum preprocessing and the mid infrared spectra after the spectrum preprocessing of the calibration set and the verification set respectively to obtain the preprocessing near infrared spectrum variable screening matrix and the preprocessing mid infrared spectrum variable screening matrix of the calibration set, and the preprocessing near infrared spectrum variable screening matrix and the preprocessing mid infrared spectrum variable screening matrix of the verification set, wherein the spectrum variable screening processing comprises the competitive adaptive reweighted sampling processing or/and the variable importance projection processing;

inputting the near infrared spectrum preprocessing matrix and the index matrix of the calibration set into the detection model, and training the detection model to obtain the third coefficient matrix;

inputting the mid infrared spectrum preprocessing matrix and the index matrix of the calibration set into the detection model, and training the detection model to obtain the fourth coefficient matrix;

inputting the near infrared spectrum preprocessing matrix of the calibration set into the detection model corresponding to the third coefficient matrix to obtain the calibration set third index prediction matrix composed of the predicted values of the detection indexes of the calibration set;

inputting the mid infrared spectrum preprocessing matrix of the calibration set into the detection model corresponding to the fourth coefficient matrix to obtain the calibration set fourth index prediction matrix composed of the predicted values of the detection indexes of the calibration set;

inputting the near infrared spectrum preprocessing matrix of the verification set into the detection model corresponding to the third coefficient matrix to obtain the verification set third index prediction matrix composed of the predicted values of the detection indexes of the verification set;

inputting the mid infrared spectrum preprocessing matrix of the verification set into the detection model corresponding to the fourth coefficient matrix to obtain the verification set fourth index prediction matrix composed of the predicted values of the detection indexes of the verification set;

obtaining the third verification value and the fourth verification value respectively according to the verification indexes through the verification set third index prediction matrix, the verification set fourth index prediction matrix and the index matrix, wherein the verification indexes are used for representing the prediction performance of the detection model;

taking an optimal value of the third verification value and the fourth verification value as the optimal verification value, taking the optimal verification value as the threshold value, and taking the range of the threshold value in the direction of improving the prediction performance of the detection model as the threshold value range;

performing the data-level fusion on the near infrared spectrum preprocessing matrix and the mid infrared spectrum preprocessing matrix of the calibration set to form the calibration set second data-level fusion matrix, and inputting the calibration set second data-level fusion matrix and the index matrix of the calibration set into the detection model to train the detection model to obtain the sixth coefficient matrix;

taking the calibration set second data-level fusion matrix as the input matrix, inputting the detection model corresponding to the sixth coefficient matrix, and obtaining the calibration set sixth index prediction matrix composed of the predicted values of the detection indexes of the verification set;

taking the verification set second data-level fusion matrix formed by the data-level fusion of the near infrared spectrum preprocessing matrix and the mid infrared spectrum preprocessing matrix of the verification set as the input matrix, and inputting the detection model corresponding to the sixth coefficient matrix to obtain the verification set sixth index prediction matrix composed of the predicted values of the detection indexes of the verification set;

respectively obtaining the sixth verification value according to the verification indexes through the verification set sixth index prediction matrix and the index matrix;

performing the feature-level fusion on the preprocessing near infrared spectrum variable screening matrix and the preprocessing mid infrared spectrum variable screening matrix of the calibration set to form the calibration set second feature-level fusion matrix, inputting the calibration set second feature-level fusion matrix and the index matrix of the calibration set into the detection model, and training the detection model to obtain the eighth coefficient matrix;

taking the calibration set second feature-level fusion matrix as the input matrix, inputting the detection model corresponding to the eighth coefficient matrix, and obtaining the calibration set eighth index prediction matrix composed of the predicted values of the detection indexes of the calibration set;

taking the verification set second feature-level fusion matrix formed by the data-level fusion of the preprocessing near infrared spectrum variable screening matrix and the preprocessing mid infrared spectrum variable screening matrix of the verification set as the input matrix, and inputting the detection model corresponding to the eighth coefficient matrix to obtain the verification set eighth index prediction matrix composed of the predicted values of the detection indexes of the verification set;

respectively obtaining the eighth verification value according to the verification indexes through the verification set eighth index prediction matrix and the index matrix;

screening the third verification value, the fourth verification value, the sixth verification value, and the eighth verification value according to the threshold value range, and screening out the verification value group within the threshold value range; and carrying out the decision-level fusion on the calibration set index matrix corresponding to the verification value group to obtain the calibration set decision-level fusion matrix, inputting the calibration set decision-level fusion matrix and the calibration set index matrix into the detection model, and training the detection model to obtain the ninth coefficient matrix, wherein the ninth coefficient matrix is the trained coefficient matrix.

7. The detection method based on the multi-spectral data fusion according to claim 6, wherein the verification indexes comprise a determination coefficient or/and a predicted root mean square error.

8. The detection method based on the multi-spectral data fusion according to claim 6, wherein the optimal verification value is a minimum value of a predicted root mean square error or/and a maximum value of a determination coefficient; and the threshold value range is not greater than the minimum value of the predicted root mean square error or/and not less than the maximum value of the determination coefficient.

9. The detection method based on the multi-spectral data fusion according to claim 1, wherein in a step of dividing the training sets into the calibration set and the verification set:
randomly dividing the calibration set and the verification set in the training sets according to a ratio of 2:1-4:1.

10. The detection method based on the multi-spectral data fusion according to claim 9, randomly dividing the calibration set and the verification set in the training sets according to a ratio of 3:1.

11. The detection method based on the multi-spectral data fusion according to claim 1, wherein in the steps of training the detection model, there are the various spectrum preprocessing or/and the spectrum variable screening processing, and training the training model by using each spectrum preprocessing, each spectrum variable screening processing and a combination of the each spectrum preprocessing and the spectrum variable screening processing.

12. The detection method based on the multi-spectral data fusion according to claim 1, wherein a method of the data-level fusion, the feature-level fusion and the decision-level fusion comprises:
splicing a same-dimension matrix to perform the data-level fusion, the feature-level fusion or the decision-level fusion.

13. A non-transitory computer-readable storage medium, wherein the non-transitory computer-readable storage medium comprises a program based on multi-spectral data fusion, wherein when the program based on the multi-spectral data fusion is executed by a processor, steps of the detection method based on the multi-spectral data fusion according to claim 1 are realized.

14. A detection system based on multi-spectral data fusion, comprising:
a collection module, employing a processor and collecting near infrared spectrum and mid infrared spectrum of a substance to be detected to obtain a near infrared spectrum matrix and a mid infrared spectrum matrix of the substance to be detected;
a detection model construction module, employing the processor and constructing a detection model by a following formula, $$Y = XP^T BQ,$$

wherein X is an input matrix, Y is an output matrix, B is a coefficient matrix, and P and Q are load matrices of X and Y respectively; and T is a score matrix of an independent variable X;
a training module, employing the processor and training the detection model; and
a detection module, employing the processor and predicting detection indexes;
wherein the training module comprises:
a training set construction unit, employing the processor and collecting training samples to construct training sets, wherein the training sets comprise near infrared spectra and mid infrared spectra of a plurality of the training samples and index values of detection indexes of the plurality of the training samples;
a training set dividing unit, employing the processor and dividing the training sets constructed by the training set construction unit into a calibration set and a verification set to obtain a near infrared spectrum matrix, a mid infrared spectrum matrix and an index matrix of the calibration set and a near infrared spectrum matrix, a mid infrared spectrum matrix and an index matrix of the verification set;
a spectrum preprocessing unit, employing the processor and performing spectrum preprocessing on near infrared spectra and mid infrared spectra of the calibration set and the verification set obtained by the training set dividing unit respectively to obtain a near infrared spectrum preprocessing matrix and a mid infrared spectrum preprocessing matrix of the calibration set, and a near infrared spectrum preprocessing matrix and a mid infrared spectrum preprocessing matrix of the verification set;
a spectrum variable screening unit, employing the processor and performing spectrum variable screening processing on the near infrared spectra, the mid infrared spectra, near infrared spectra after the spectrum preprocessing and mid infrared spectra after the spectrum preprocessing of the calibration set and the verification set obtained by the training set dividing unit respectively to obtain a near infrared spectrum variable screening matrix, a mid infrared spectrum variable screening matrix, a preprocessing near infrared spectrum variable screening matrix and a preprocessing mid infrared spectrum variable screening matrix of the calibration set, and a near infrared spectrum variable screening matrix, a mid infrared spectrum variable screening matrix, a preprocessing near infrared spectrum variable screening matrix and a preprocessing mid infrared spectrum variable screening matrix of the verification set;
a first training unit, employing the processor and inputting the near infrared spectrum matrix and the index matrix of the calibration set obtained by the training set dividing unit into the detection model, and training the detection model to obtain a first coefficient matrix;
a second training unit, employing the processor and inputting the mid infrared spectrum matrix and the index matrix of the calibration set obtained by the training set dividing unit into the detection model, and training the detection model to obtain a second coefficient matrix;
a third training unit, employing the processor and inputting the near infrared spectrum preprocessing matrix and the index matrix of the calibration set obtained by the spectrum preprocessing unit into the detection model, and training the detection model to obtain a third coefficient matrix;
a fourth training unit, employing the processor and inputting the mid infrared spectrum preprocessing matrix and the index matrix of the calibration set obtained by the spectrum preprocessing unit into the detection model, and training the detection model to obtain a fourth coefficient matrix;
a first prediction unit, employing the processor and inputting the near infrared spectrum matrix of the calibration set obtained by the training set dividing unit into the detection model corresponding to the first coefficient matrix to obtain a calibration set first index prediction matrix composed of predicted values of detection indexes of the calibration set;
a second prediction unit, employing the processor and inputting the mid infrared spectrum matrix of the calibration set obtained by the training set dividing unit into the detection model corresponding to the second coefficient matrix to obtain a calibration set second index prediction matrix composed of the predicted values of the detection indexes of the calibration set;
a third prediction unit, employing the processor and inputting the near infrared spectrum preprocessing matrix of the calibration set obtained by the spectrum preprocessing unit into the detection model corresponding to the third coefficient matrix to obtain a calibration set third index prediction matrix composed of the predicted values of the detection indexes of the calibration set;

a fourth prediction unit, employing the processor and inputting the mid infrared spectrum preprocessing matrix of the calibration set obtained by the spectrum preprocessing unit into the detection model corresponding to the fourth coefficient matrix to obtain a calibration set fourth index prediction matrix composed of the predicted values of the detection indexes of the calibration set;

a fifth prediction unit, employing the processor and inputting the near infrared spectrum matrix of the verification set obtained by the training set dividing unit into the detection model corresponding to the first coefficient matrix to obtain a verification set first index prediction matrix composed of predicted values of detection indexes of the verification set;

a sixth prediction unit, employing the processor and inputting the mid infrared spectrum matrix of the verification set obtained by the training set dividing unit into the detection model corresponding to the second coefficient matrix to obtain a verification set second index prediction matrix composed of the predicted values of the detection indexes of the verification set;

a seventh prediction unit, employing the processor and inputting the near infrared spectrum preprocessing matrix of the verification set obtained by the spectrum preprocessing unit into the detection model corresponding to the third coefficient matrix to obtain a verification set third index prediction matrix composed of the predicted values of the detection indexes of the verification set;

an eighth prediction unit, employing the processor and inputting the mid infrared spectrum preprocessing matrix of the verification set obtained by the spectrum preprocessing unit into the detection model corresponding to the fourth coefficient matrix to obtain a verification set fourth index prediction matrix composed of the predicted values of the detection indexes of the verification set;

a first verification unit, employing the processor and obtaining a first verification value, a second verification value, a third verification value and a fourth verification value respectively according to verification indexes through the verification set first index prediction matrix obtained by the fifth prediction unit, the verification set second index prediction matrix obtained by the sixth prediction unit, the verification set third index prediction matrix obtained by the seventh prediction unit, the verification set fourth index prediction matrix obtained by the eighth prediction unit and the index matrix obtained by the training set dividing unit, wherein the verification indexes are used for representing prediction performance of the detection model;

a threshold value range obtaining unit, employing the processor and taking an optimal value of the first verification value, the second verification value, the third verification value and the fourth verification value obtained by the first verification unit as an optimal verification value, taking the optimal verification value as a threshold value, and taking a range of the threshold value in a direction of improving the prediction performance of the detection model as a threshold value range;

a fifth training unit, employing the processor and performing data-level fusion on the near infrared spectrum matrix and the mid infrared spectrum matrix of the calibration set obtained by the training set dividing unit to form a calibration set first data-level fusion matrix, and inputting the calibration set first data-level fusion matrix and the index matrix of the calibration set into the detection model to train the detection model to obtain a fifth coefficient matrix;

a sixth training unit, employing the processor and performing the data-level fusion on the near infrared spectrum preprocessing matrix and the mid infrared spectrum preprocessing matrix of the calibration set obtained by the spectrum preprocessing unit to form a calibration set second data-level fusion matrix, and inputting the calibration set second data-level fusion matrix and the index matrix of the calibration set into the detection model to train the detection model to obtain a sixth coefficient matrix;

a ninth prediction unit, employing the processor and taking the calibration set first data-level fusion matrix as the input matrix, inputting the detection model corresponding to the fifth coefficient matrix, and obtaining a calibration set fifth index prediction matrix composed of the predicted values of the detection indexes of the calibration set;

a tenth prediction unit, employing the processor and taking the calibration set second data-level fusion matrix as the input matrix, inputting the detection model corresponding to the sixth coefficient matrix, and obtaining a calibration set sixth index prediction matrix composed of the predicted values of the detection indexes of the verification set;

an eleventh prediction unit, employing the processor and taking a verification set first data-level fusion matrix formed by data-level fusion of the near infrared spectrum matrix and the mid infrared spectrum matrix of the verification set as the input matrix, and inputting the detection model corresponding to the fifth coefficient matrix to obtain a verification set fifth index prediction matrix composed of the predicted values of the detection indexes of the verification set;

a twelfth prediction unit, employing the processor and taking a verification set second data-level fusion matrix formed by data-level fusion of the near infrared spectrum preprocessing matrix and the mid infrared spectrum preprocessing matrix of the verification set as the input matrix, and inputting the detection model corresponding to the sixth coefficient matrix to obtain a verification set sixth index prediction matrix composed of the predicted values of the detection indexes of the verification set;

a second verification unit, employing the processor and respectively obtaining a fifth verification value and a sixth verification value according to the verification indexes through the verification set fifth index prediction matrix, the verification set sixth index prediction matrix and the index matrix;

a seventh training unit, employing the processor and performing feature-level fusion on the near infrared spectrum variable screening matrix and the mid infrared spectrum variable screening matrix of the calibration set to form a calibration set first feature-level fusion matrix, inputting the calibration set first feature-level fusion matrix and the index matrix of the calibration set into the detection model, and training the detection model to obtain a seventh coefficient matrix;

an eighth training unit, employing the processor and performing the feature-level fusion on the preprocessing near infrared spectrum variable screening matrix and the preprocessing mid infrared spectrum variable screening matrix of the calibration set to form a calibration set second feature-level fusion matrix, inputting the calibration set second feature-level fusion matrix and the index matrix of the calibration set into the detection model, and training the detection model to obtain an eighth coefficient matrix;

a thirteenth prediction unit, employing the processor and taking the calibration set first feature-level fusion matrix as the input matrix, inputting the detection model corresponding to the seventh coefficient matrix, and obtaining a calibration set seventh index prediction matrix composed of the predicted values of the detection indexes of the calibration set;

a fourteenth prediction unit, employing the processor and taking the calibration set second feature-level fusion matrix as the input matrix, inputting the detection model corresponding to the eighth coefficient matrix, and obtaining a calibration set eighth index prediction matrix composed of the predicted values of the detection indexes of the calibration set;

a fifteenth prediction unit, employing the processor and taking a verification set first feature-level fusion matrix formed by feature-level fusion of the near infrared spectrum variable screening matrix and the mid infrared spectrum variable screening matrix of the verification set as the input matrix, and inputting the detection model corresponding to the seventh coefficient matrix to obtain a verification set seventh index prediction matrix composed of the predicted values of the detection indexes of the verification set;

a sixteenth prediction unit, employing the processor and taking a verification set second feature-level fusion matrix formed by data-level fusion of the preprocessing near infrared spectrum variable screening matrix and the preprocessing mid infrared spectrum variable screening matrix of the verification set as the input matrix, and inputting the detection model corresponding to the eighth coefficient matrix to obtain a verification set eighth index prediction matrix composed of the predicted values of the detection indexes of the verification set;

a third verification unit, employing the processor and respectively obtaining a seventh verification value and an eighth verification value according to the verification indexes through the verification set seventh index prediction matrix, the verification set eighth index prediction matrix and the index matrix;

a verification value screening unit, employing the processor and screening the first verification value to the eighth verification value according to the threshold value range, and screening out a verification value group within the threshold value range; and a ninth training unit, employing the processor and carrying out decision-level fusion on a calibration set index matrix corresponding to the verification value group to obtain a calibration set decision-level fusion matrix, inputting the calibration set decision-level fusion matrix and the calibration set index matrix into the detection model, and training the detection model to obtain a ninth coefficient matrix, wherein the ninth coefficient matrix is a trained coefficient matrix;

wherein the detection module comprises:

a data-level fusion unit, employing the processor and performing the data-level fusion on the near infrared spectrum matrix and the mid infrared spectrum matrix of the substance to be detected to obtain a spectral fusion matrix; and a prediction unit, employing the processor and inputting a spectral fusion matrix obtained by the data-level fusion unit as the input matrix into a trained detection model to obtain a first index matrix as the output matrix; and taking the first index matrix as a detection result of the detection indexes of the substance to be detected; and wherein the index matrix is a matrix composed of index values of detection indexes determined by measurements; the first index matrix is a matrix composed of index values of detection indexes predicted by the detection model; and the detection indexes comprise one or more of a flash point, a pour point, density and kinematic viscosity.

15. The detection system based on the multi-spectral data fusion according to claim 14, wherein the detection module further comprises:

a decision-level fusion unit, employing the processor, inputting the near infrared spectrum matrix of the substance to be detected as the input matrix into the trained detection model to obtain a second index matrix as the output matrix; inputting the mid infrared spectrum matrix of the substance to be detected as the input matrix into the trained detection model to obtain a third index matrix as the output matrix; and performing the decision-level fusion on the first index matrix, the second index matrix and the third index matrix to obtain a fourth index matrix;

wherein the prediction unit inputs the fourth index matrix of the decision-level fusion unit as the input matrix into the trained detection model to obtain a fifth index matrix as the output matrix; and taking the fifth index matrix as the detection result of the detection indexes of the substance to be detected; and wherein the second index matrix, the third index matrix and the fifth index matrix are matrices composed of the index values of the detection indexes predicted by the detection model.

16. The detection system based on the multi-spectral data fusion according to claim 14, wherein the verification indexes comprise a determination coefficient or/and a predicted root mean square error.

17. The detection system based on the multi-spectral data fusion according to claim 14, wherein the optimal verification value is a minimum value of a predicted root mean square error or/and a maximum value of a determination coefficient; and the threshold value range is not greater than the minimum value of the predicted root mean square error or/and not less than the maximum value of the determination coefficient.

* * * * *